US011238491B2

(12) United States Patent
Eich et al.

(10) Patent No.: US 11,238,491 B2
(45) Date of Patent: Feb. 1, 2022

(54) ATTENTION METRICS FOR ATTENTION APPLICATIONS

(71) Applicant: Brave Software, Inc., San Francisco, CA (US)

(72) Inventors: Brendan Eich, Santa Clara, CA (US); Luke Mulks, Dublin, CA (US); Benjamin Livshits, London (GB); Yan Zhu, San Francisco, CA (US)

(73) Assignee: Brave Software, Inc., San Francisco, CA (US)

( * ) Notice: Subject to any disclaimer, the term of this patent is extended or adjusted under 35 U.S.C. 154(b) by 0 days.

(21) Appl. No.: 16/435,808

(22) Filed: Jun. 10, 2019

(65) Prior Publication Data
US 2019/0378164 A1   Dec. 12, 2019

Related U.S. Application Data

(60) Provisional application No. 62/683,000, filed on Jun. 10, 2018, provisional application No. 62/683,001, filed on Jun. 10, 2018.

(51) Int. Cl.
*G06Q 30/02* (2012.01)
*G06F 3/01* (2006.01)
(Continued)

(52) U.S. Cl.
CPC ......... *G06Q 30/0246* (2013.01); *G06F 3/013* (2013.01); *G06Q 30/0242* (2013.01);
(Continued)

(58) Field of Classification Search
CPC ............ G06Q 30/0246; G06Q 30/0242; G06Q 30/0254; G06Q 30/0269; G06Q 30/0272;
(Continued)

(56) References Cited

U.S. PATENT DOCUMENTS 8,510,166 B2 *  8/2013  Neven ..................... G06F 3/013
                                                 705/14.68
8,639,920 B2 *  1/2014  Stack .................. G06Q 30/0269
                                                 713/150
(Continued)

FOREIGN PATENT DOCUMENTS

WO   WO-2012162387 A1 * 11/2012  ......... G06Q 30/0224
WO   WO-2016109069 A1 *  7/2016  ............ G06F 3/165

OTHER PUBLICATIONS

Behavior-Based Approach for User Interests Prediction 2017 IEEE/ACS 14th International Conference on Computer Systems and Applications Chayma Amri, Mariem Bambia, Rim Faiz (Year: 2017).*
(Continued)

*Primary Examiner* — Alexandru Cirnu
(74) *Attorney, Agent, or Firm* — Sanderson IP Law, Ltd.

(57) ABSTRACT

An attention application measures a user's attention focused on publisher content and advertisements to create an attention metric. Attention can be measured via hardware sensors or by user interactions with input/output hardware. A user attention metric profile can be used to modify content, content presentation, and/or match ads. Aggregate attention metrics can be used by publishers or third parties. Attention consumers may reward attention with a digital asset. A proof-of-attention can be made based on secure attention sensor hardware and/or a zero-knowledge proof.

16 Claims, 17 Drawing Sheets

(51) Int. Cl.
*H04N 21/442* (2011.01)
*H04N 21/4784* (2011.01)
*H04N 21/45* (2011.01)
*H04L 29/08* (2006.01)

(52) U.S. Cl.
CPC ..... *G06Q 30/0254* (2013.01); *G06Q 30/0269* (2013.01); *G06Q 30/0272* (2013.01); *G06Q 30/0273* (2013.01); *H04N 21/44204* (2013.01); *H04N 21/4532* (2013.01); *H04N 21/4784* (2013.01); *H04L 67/02* (2013.01)

(58) Field of Classification Search
CPC .............. G06Q 30/0273; G06F 3/013; H04N 21/44204; H04N 21/4784; H04N 21/4532; H04N 21/812; H04L 67/02; H04L 67/306; H04L 67/22
See application file for complete search history.

(56) References Cited

U.S. PATENT DOCUMENTS

| | | | | |
|---|---|---|---|---|
| 8,789,198 | B2* | 7/2014 | Phillips | H04L 67/02 726/26 |
| 8,818,474 | B2* | 8/2014 | Berson | G06F 21/64 600/323 |
| 8,843,951 | B1* | 9/2014 | Sherrets | H04H 60/43 725/14 |
| 8,914,496 | B1* | 12/2014 | Richardson | H04L 43/08 709/224 |
| 8,949,889 | B1* | 2/2015 | Erdmann | G06Q 30/0242 725/34 |
| 2004/0073795 | A1* | 4/2004 | Jablon | H04W 12/003 713/171 |
| 2008/0169930 | A1* | 7/2008 | Mallinson | G06Q 30/02 340/573.1 |
| 2009/0254931 | A1* | 10/2009 | Pizzurro | H04N 21/435 725/5 |
| 2013/0238433 | A1* | 9/2013 | Kamdar | G06Q 30/0241 705/14.53 |
| 2014/0282642 | A1 | 10/2014 | Needham et al. | |
| 2014/0344455 | A1* | 11/2014 | Cheng | G06F 16/958 709/224 |
| 2016/0247201 | A1* | 8/2016 | Pool | G06Q 30/0255 |
| 2016/0300283 | A1 | 10/2016 | Soderstrom | |
| 2017/0278417 | A1 | 9/2017 | Ur et al. | |
| 2018/0068579 | A1* | 3/2018 | Geritz | G06Q 50/2057 |

OTHER PUBLICATIONS

International Search Report of the International Bureau, US International Searching Authority dated Oct. 25, 2019 in counterpart PCT case No. PCT/US2019/036283.

Written Opinion of the International Bureau, US International Searching Authority dated Oct. 25, 2019 in counterpart PCT case No. PCT/US2019/036283.

Ahn, Jae-Hyeon, Attention to Banner Ads and Their Effectiveness: An Eye-Tracking Approach, International Journal of Electronic Commerce, Oct. 2012.

Bose, Joy, et al.. Attention Sensitive Web Browsing, Jan. 2016.

Wang, Jyun-Cheng, The Effects of Attention Inertia on Advertisements on the WWW, Computers in Human Behavior 23, Nov. 18, 2005.

Geissler, Gary L., et al., The Influence of Home Page Complexity on Consumer Attention, Attitudes, and Purchase Intent, Journal of Advertising, vol. 35, No. 2 (Summer 2006), pp. 69-80.

Busher, Georg, et al., What Do You See When You're Surfing? Using Eye Tracking to Predict Salient Regions of Web Pages, CHI 2009, Apr. 4-9, 2009, Boston, Massachusetts, USA.

* cited by examiner

FIG. 4
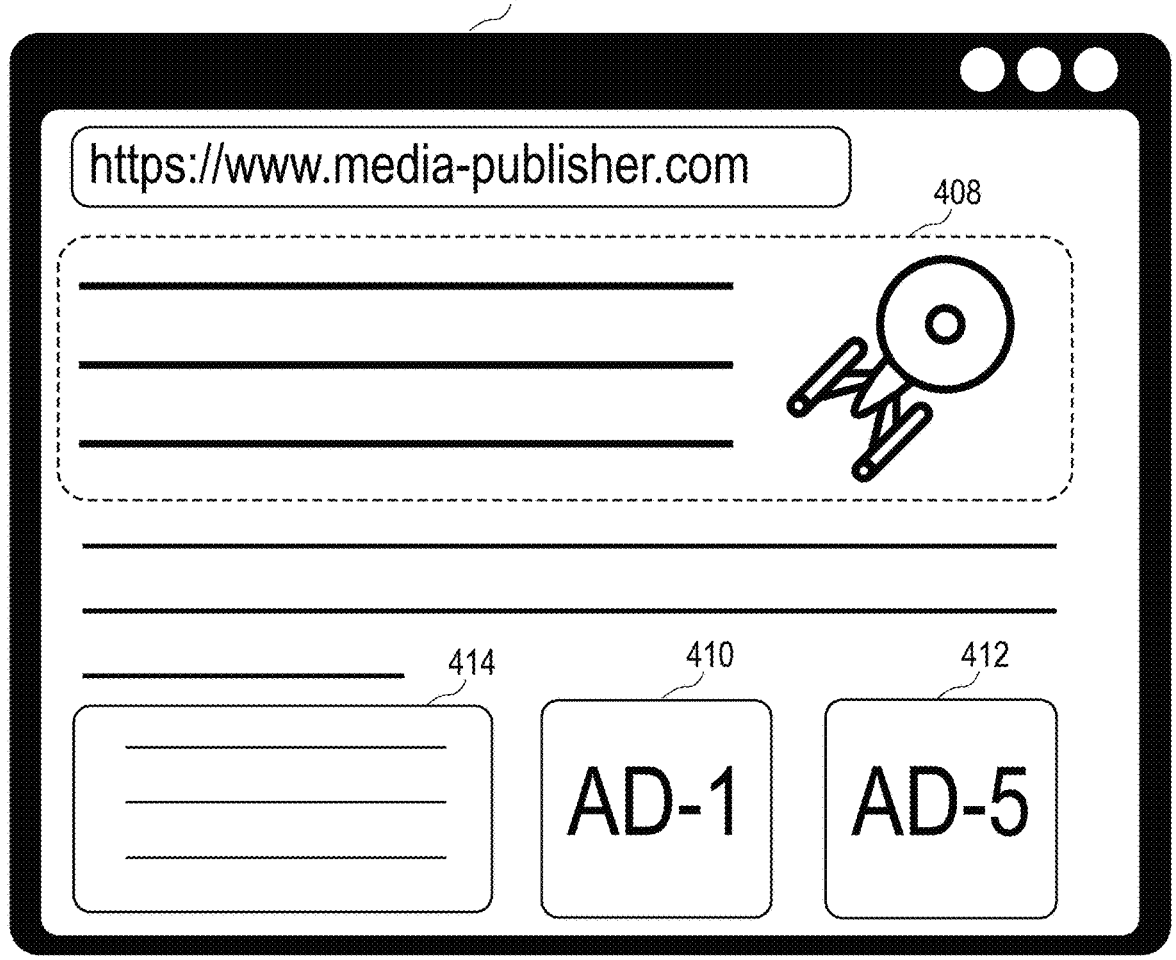
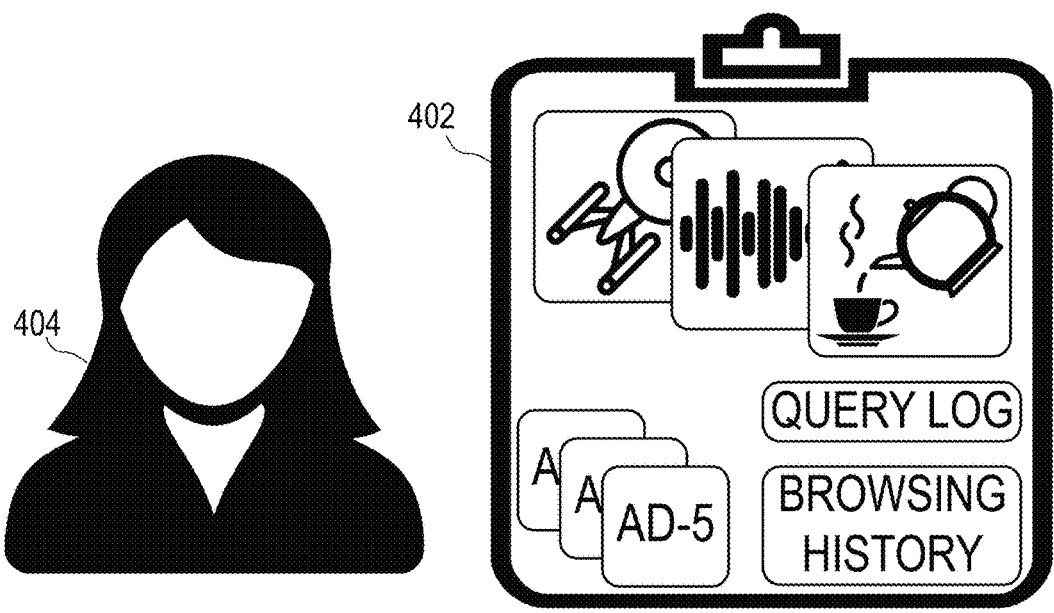

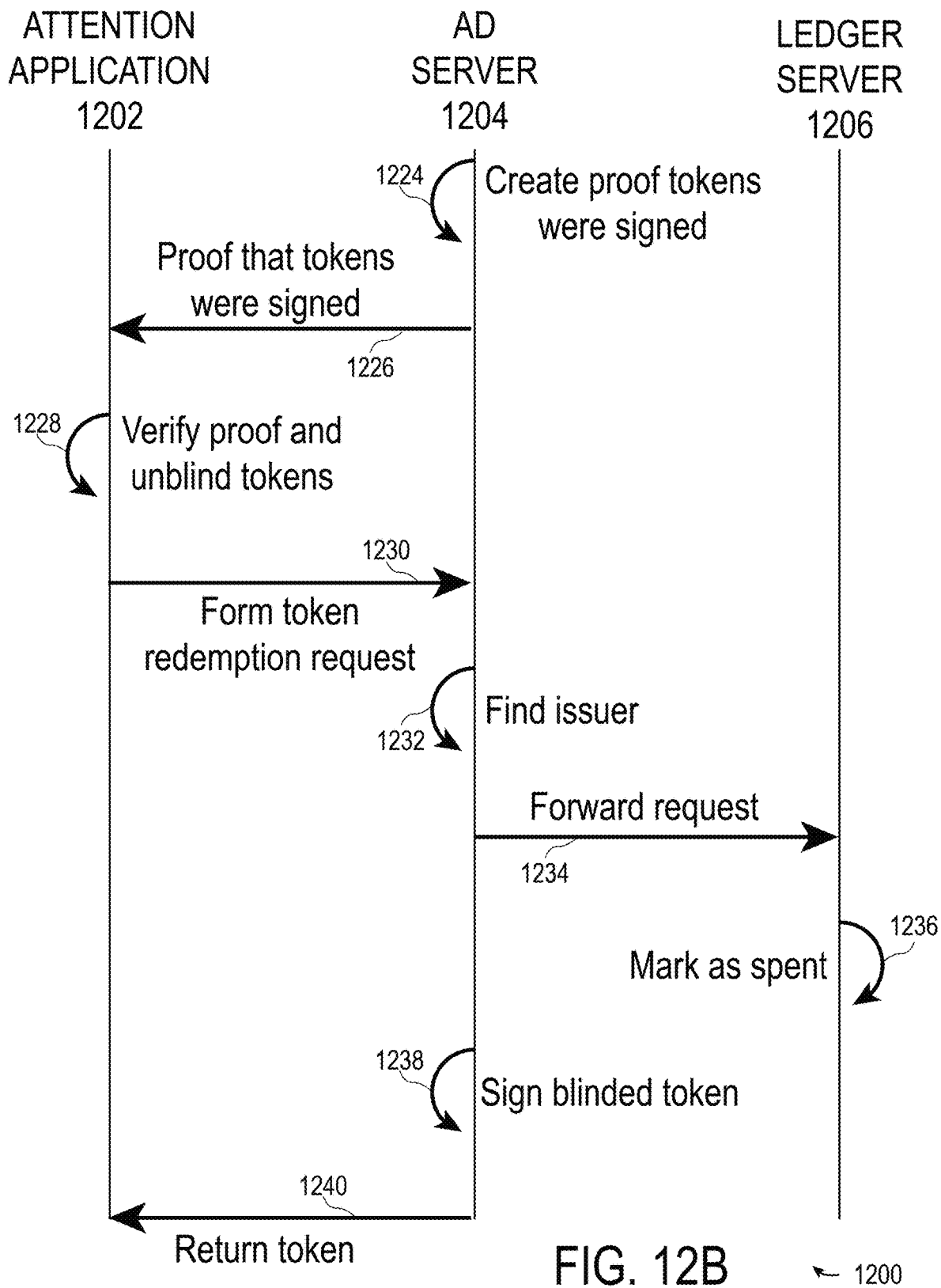

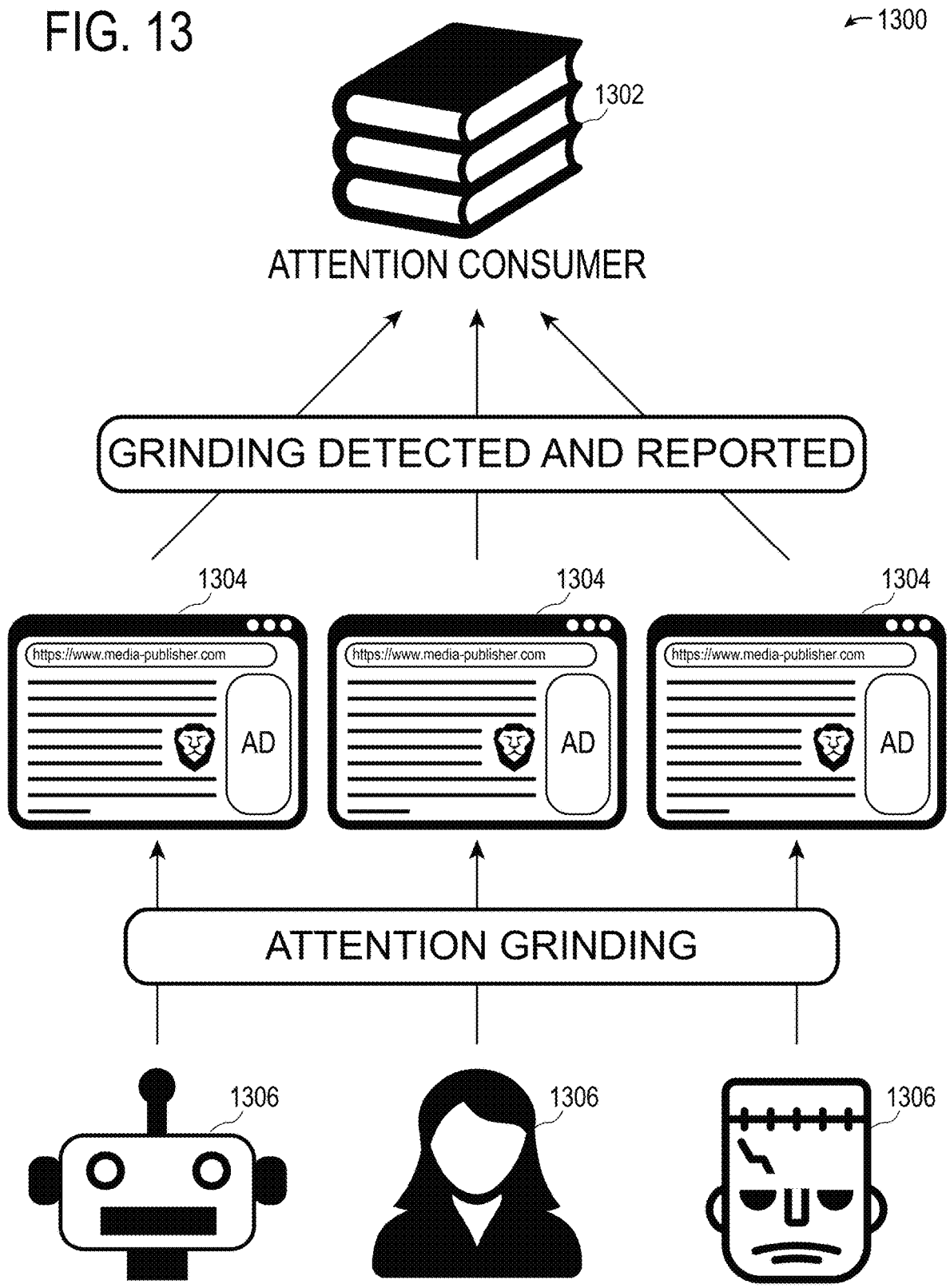

ATTENTION METRICS FOR ATTENTION APPLICATIONS

CROSS-REFERENCE TO RELATED APPLICATIONS

This application is a non-provisional application claiming priority benefit of U.S. Provisional Patent Application Nos. 62/683,000 and 62/683,001, entitled "Attention Metrics for Attention Applications" and "Attention Application User Classification Privacy," respectively, both filed Jun. 10, 2018 and incorporated by reference herein.

BACKGROUND OF THE INVENTION

Advertising on the World Wide Web and in other electronic forms is often rife with fraud. Typical advertising models include per-click and eyeball-based pricing schemes wherein automated systems can simulate authentic user interaction. Advertisers therefore lack confidence that their ad dollars are being spent on authentic user views. Even for ad views that are not fraudulent, advertisers and content producers lack understanding of how much user attention was spent on the respective ads and content.

Accordingly, there is a need for reliable collection and measurement of user attention devoted to media content including advisements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 4 is a diagram of an example arrangement of media content in an attention application based on a user attention profile in accordance with some implementations.

FIG. 12B is a continued signal diagram of the system including an attention application collecting provable attention indicia of a user and proving via a zero-knowledge proof that conceals the user identity FIG. 13 is a diagram of detection of attention grinding by an attention application in accordance with some implementations.

Figure 1:
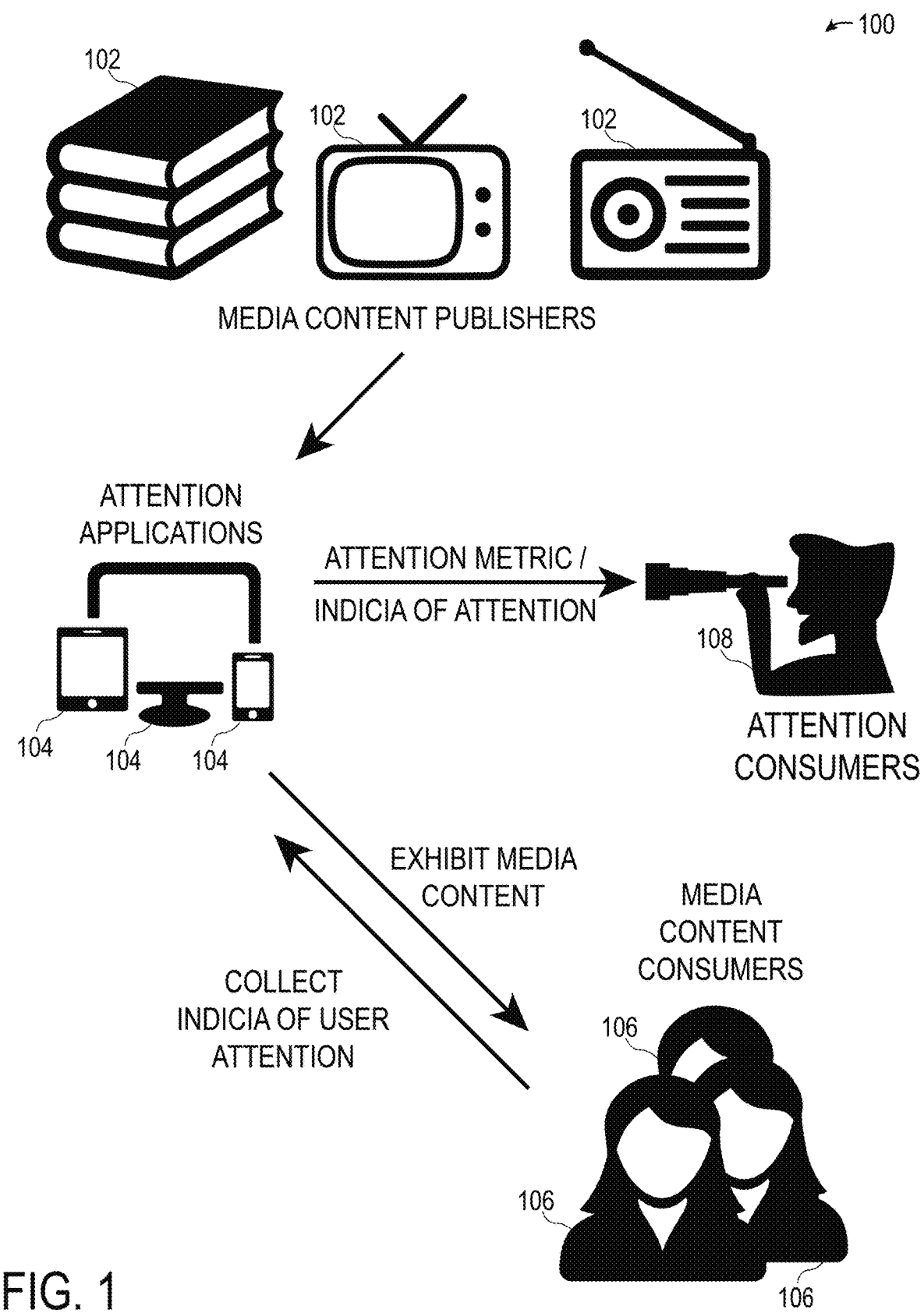
FIG. 1 is a diagram of attention applications displaying media content to media content consumers and collecting user attention metrics in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Attention applications are high-interaction computer programs that present media content to an end user. Example attention applications include without limitation web browsers, e-readers, virtual reality (VR) systems, audio playback applications (e.g., music, podcast, lectures, etc.), gaming systems, video delivery systems, applications for browsing specialized online content (e.g., online forum browsers), etc. Attention applications may run on generalized computer hardware (e.g., desktop, laptop, smart phone, tablet) or specialized hardware (e.g., e-reader hardware, gaming system, VR system).

Media content displayed on attention applications can be combined with customized advertising content selected based on a relationship to the media content or on known information regarding the user (also referred to herein as media content consumers). If media content publishers and online advertisers can collect detailed data regarding which portions of media content and advertising are attractive to users (e.g., where the users are directing their attention while browsing the media content) via an attention metric, then media content and advertising can be customized for individual users, categories of users, and/or all users according to the attention metric. On the other hand, users may not wish to reveal information to third parties regarding their attention activities (e.g., browsing history, attention history, query logs, purchase history, map query log, mobile device data, music play history, streaming history, e-mail content, contact list, etc.) due to privacy concerns. Of particular concern to the user is the protection of personally identifiable information (e.g., the user's real name, address, email, payments and/or purchase history, browser query log, browser history, contact list, which ads have been viewed, which advertising market segments the user has been classified in, previously used cryptocurrency wallet addresses, credit card numbers, any information protected under the EU General Data Protection Regulation, etc.) and defending against the unauthorized linkage thereto with the online activities of the user. Disclosed herein therefore is an attention metric for attention applications to provably report reliable attention metric information of the users and reward users based thereon while leaving control of private attention history in the hands of users.

The disclosure herein is an improvement over the status quo web browsing advertising system wherein users are harvested for their attention data with techniques like web trackers, cookies, pixel links, etc. for ad matching done in the cloud. Websites may sell data linking personally identifiable information of users to other online activities (e.g., large online retailer sells purchase history and streaming video and music histories to websites wishing to target the user). The majority of the revenue in this model is captured by ad-tech companies that increasingly develop abusive tracking and privacy practices to squeeze more ad revenue from each user. Content producers receive only a small fraction of ad revenue and end users spending their attention to view the actual ads typically get nothing of monetary remuneration for doing so, despite sometimes frequent abusive ad techniques (e.g., controlling audio, full-screen video, content links disguised as close buttons to trick the user into navigating away from the page, etc.). End users often find the only reasonable course of action to avoid abusive ad and privacy practices is to raise ad-blocking walls (e.g., ad-blockers that seek to block 100% of ads) and/or tracker blockers on their browsers, thus shutting out web advertising almost completely.

Collecting accurate and/or cryptographically verifiable attention data will create a new market for web advertisers that will more accurately segment users than the status quo. Some end users concerned about protecting personally identifiable information are likely to allow to pass through the adblocker wall if those ads are privacy preserving. Ad matching can be done locally to prevent any personally identifiable information from leaking such as in traditional ad matching.

FIG. 1 is a diagram 100 of attention applications 104 receiving media content from media content publishers 102 and exhibiting the media content to media content consumers 106 (e.g., end users of a web browser). The media content publishers 102 may include websites, streaming audio and video services, microblogging platforms, file servers (e.g., music, e-book servers), app stores, online forums, chat channels, cloud services (e.g., email providers), internet or terrestrial radio, video and/or phone conferencing providers, etc. Media content displayed on attention applications 104 may include third party content (e.g., advertising) in addition to first party content from the media content publishers 102 and potentially first party advertising (ads selected directly by the media content publishers 102 themselves).

Media content consumers 106 use the attention applications 104 to view media content from the publishers 102. In the course of usage, the attention applications 104 collect indicia of user attention. The attention applications 104 may collect the indicia of user attention to media content in several ways. The indicia of user attention is a metric representing which media content the users 106 have paid attention to and to what degree was the attention.

In one implementation, the content consumers 106 interact with the media content via the I/O components of hardware running the attention applications 104 (e.g., a touchscreen, soft or hard keyboard, mouse, trackpad, etc.). Inputs to the I/O components, also referred to herein as indicia of user interaction, can be compared to the media content exhibited at the time the inputs are received to create a user attention metric. The content consumer 106 browses media content via I/O inputs to the device running the attention application 104 to cause, for example, scrolling, media content interaction, page turns, etc. The user I/O inputs serve as indicia of attention paid by the user to the media content during a user session.

A user session may be defined to be a period of time wherein the user remains on a website. When the user session is over, an attention metric may be created to estimate the attention paid by the user to the media content. An attention metric formula may be chosen with weighting assigned to various activities that indicate a content consumer's attention. For example, an attention unit (AU) value could be incremented for based on I/O inputs and other events driven by the user during the user session.

In one implementation, the media content is a website that includes text and images. User attention to the website content may be indicated by activities such as, for example, an amount of time that a portion of text displayed on a screen of the device running the attention application 104, a scrolling speed over text, cursor interactions (e.g., clicking, highlighting, or cursor perturbations), next page views, etc. Simply measuring an amount of time that text is displayed on a screen may provide an incomplete picture of user attention because the user may not actually be paying attention to or even looking at the text on the screen. A slow and continuous scrolling speed, on the other hand, may be evaluated as elevated attention because the user is likely scrolling as she reads. A faster scrolling speed, on the other hand, may be evaluated as reduced attention if the scrolling speed is faster than the user is likely able to read, thus indicating skimming of the text rather than close attention. Page up/down commands may also indicate a level of attention which may also be based on an estimate of a particular user's reading speed determined as described herein.

Cursor perturbations such as slight mouse movements may be taken to indicate attention because the user is actively at the terminal and likely looking at the screen of the device. Page views may be interpreted as higher attention because more of the website's text is displayed to the user but could indicate reduced attention if the page views are too close together for the user to have read all the text served with each new page view. Other cursor inputs such as clicking a link, hovering over text, highlighting text, copying text to a clipboard, may be interpreted as special attention to the affected portion of the media content. Such special attention may cause a higher overall attention metric for the user session or the attention metric may include more than just scalar data to indicate the special attention portion or a subject of the special attention portion.

After the attention applications 104 have collected indicia of user attention for a user session, the data may be used in several ways. In one implementation, the respective attention applications 104 output an attention metric locally without revealing any of the attention inputs themselves to any entity outside the device running an attention application 104. As such, the attention metric may include metadata such as the attention formula used to output the attention metric, whether any portions of the media content are designated as having been paid special attention by the content consumer 106, and/or demographic or attention profile information associated with the content consumer 106. Protecting the indicia of attention by confining it to an attention application 104 enhances privacy of the user 106 by reducing the ability of other participants to track the user across the internet or to discover sensitive information relating to the user. In some implementations, the attention metric may be provided to other participants based on a zero-knowledge cryptographic proof wherein it can be proven that an attention metric has been correctly calculated based on an attention formula without revealing the inputs to the formula.

In the example illustrated by FIG. 1, the attention applications 104 transmit an attention metric and/or indicia of attention to an attention consumer 108. The attention consumer 108 may include any of a number of participants in the system. In one implementation, the attention consumer 108 is an advertiser with advertising materials embedded in the media content viewed by a media content consumer 106. The advertiser attention consumer 108 may receive privacy-preserving attention metrics regarding the media into which the advertisement was embedded to evaluate the efficacy of the advertisement. In other implementations, the attention consumer 108 is the same entity as the media content publisher 102 that provided the media content viewed by the user during the user session. Media content publishers 102 may use such attention metric data to evaluate the efficacy of their content and inform future content development decisions.

In yet other implementations, the attention consumer 108 includes other third-party service providers. Examples include without limitation: search engines that wish to rank search results based on attention metrics, online forums giving additional weight to up/downvotes or comments relating to a piece of media content based on attention paid by the user, streaming media sites that wish to rank and review the quality of provided content based on attention metrics, e-book publishers to provide highlighted text for popular passages in books, and more.

Figure 2:
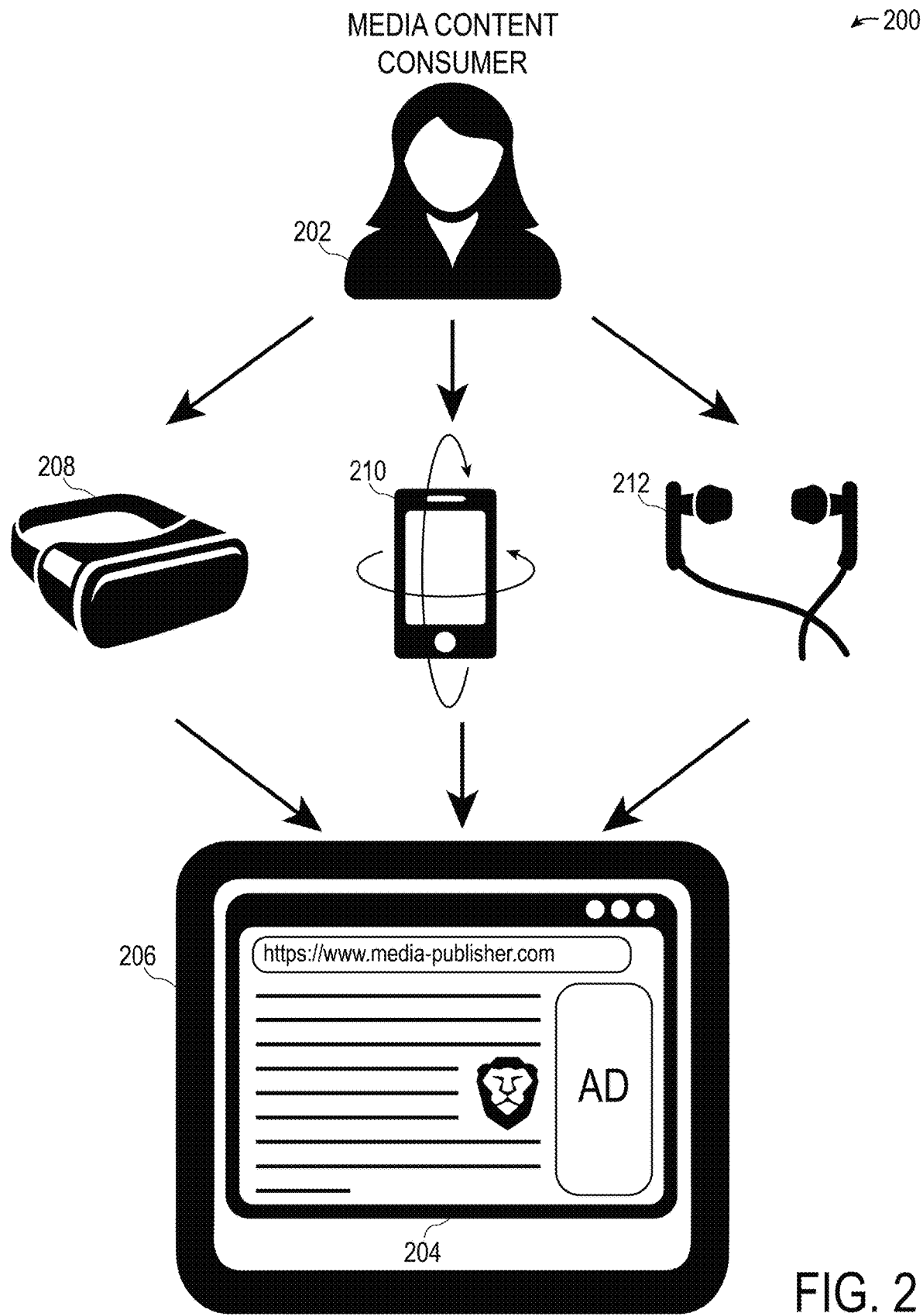
FIG. 2 is a diagram of collection of indicia of user attention by an attention application via user attention sensors in accordance with some implementations.

FIG. 2 is a diagram 200 of collection of indicia of user attention by an attention application 206 via attention sensors 208, 210, and 212 in accordance with some implementations. As illustrated in FIG. 2, attention sensors 208, 210, and 212 are communicatively coupled to a hardware device 206 running an attention application 204. The hardware device 206 includes components such as a transceiver that receives media content from a media publisher, a processor for executing an attention application, and at least one media exhibitor to present the media content to the content consumer 202 (e.g., screen, speakers, earbuds, e-ink screen, etc.).

One of the attention sensors is a VR headset 208. The VR headset may collect indicia of user attention based on head movements of the content consumer 202. Content displayed by VR headset 208 depends on the orientation of the user 202's head. In addition to collecting media content displayed to the user 202 in the VR headset 208, the VR headset may include, or be substituted by, an eye tracker. An eye tracker (e.g., a Tobii EyeX™ eye tracker), can determine and measure engagement by the user 202 with media content. Drifting eye movement patterns can indicate a reduced attention; on the other hand, focused and active eye movement patterns can indicate elevated attention. If the media content is video content, the VR headset 208 and/or eye tracker inputs can be used to determine special areas or object of interest to the user. If the media content includes text, line-by-line scanning eye movements can reliably show how many and which lines of text were read by the user 202 as well as collect data regarding reading speed and skimming activity of the user 202.

Another attention sensor illustrated in FIG. 2 is the accelerometer 210. The accelerometer 210 may be included in the hardware device 206 running the application attention 204. In one implementation, the hardware device 206 is a handheld device (e.g., e-reader, tablet, etc.). An accelerometer embedded therein may create signals indicating the content consumer 202 is holding the device in the user's hands or lap, thus indicating a higher likelihood of attention to the media content exhibited on the hardware device 206. Other signals received from the accelerometer 210, such as indications that the device is lying flat on a table, may indicate a lower likelihood of attention to the media content. Readings from the accelerometer 210 can be combined with other hardware and/or I/O inputs (e.g., page turn button on an e-reader, scrolling on a touch screen, etc.) to determine an attention metric to the media content exhibited on the attention application 204.

Another attention sensor illustrated in FIG. 2 is speakers 212. Speakers 212 may include any type of speakers (earbuds, headphones, external or internal speakers, etc.) that are equipped with a proximity sensor to detect physical proximity to the user 202. As such, if the speakers 212 are worn by the user, the speakers 212 can signal whether they are inserted into ears or placed over ears of the user 202 while the hardware device 206 is outputting audio media content. External or internal speakers can signal whether the user is within hearing range (e.g., whether the user is standing at a standing desk on which the speakers 212 are sitting). A volume level of the hardware device 206 may be taken into account to determine whether a proximity to the speakers 212 is deemed to be within hearing range.

Figure 3:
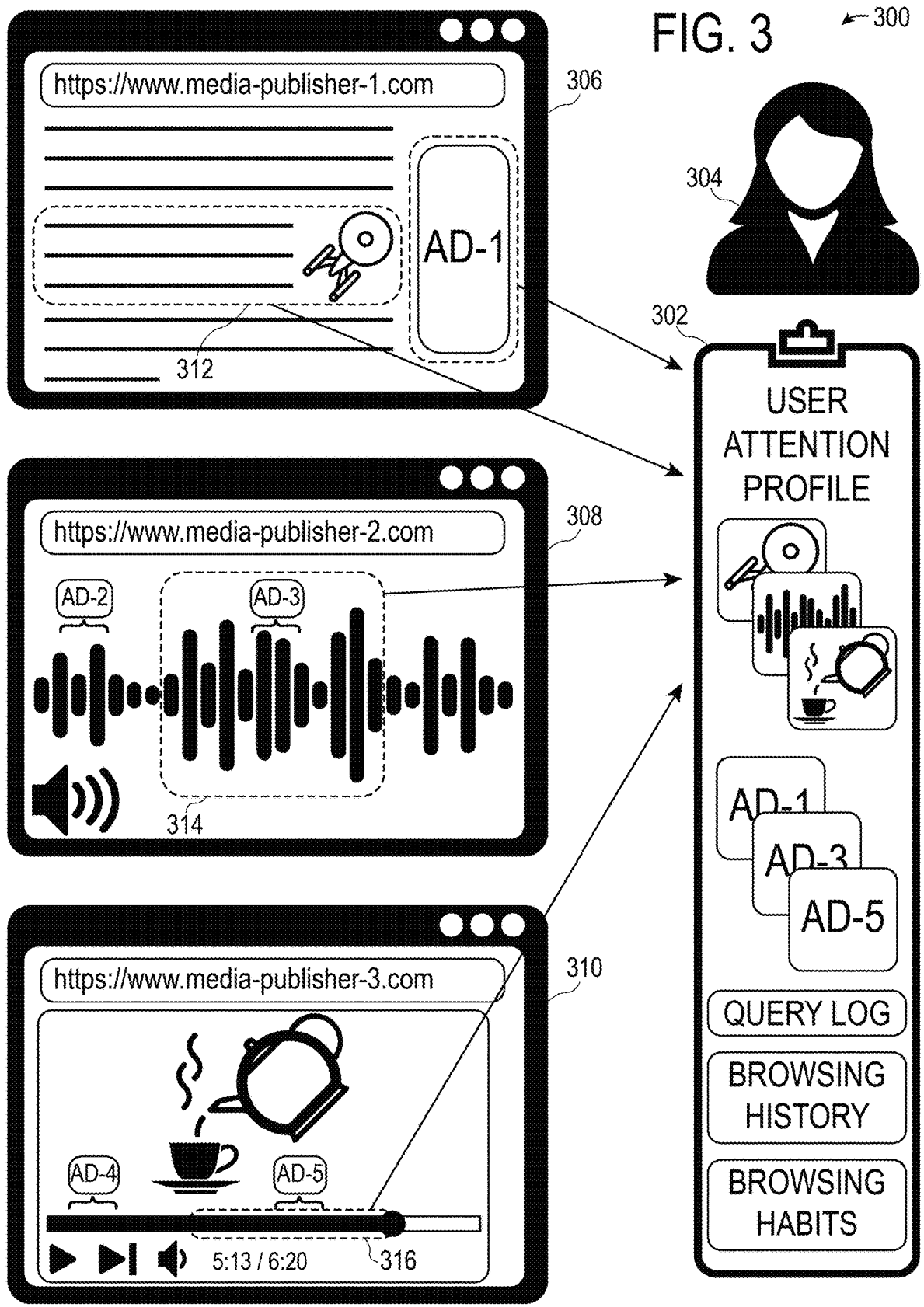
FIG. 3 is a diagram of an example user attention profile based on collection of user attention indicia from a variety on example user sessions with an attention application in accordance with some implementations.

FIG. 3 is a diagram 300 of an example user attention profile 302 based on collection of user attention indicia from a variety of example user sessions with an attention application in accordance with some implementations. In the implementation of FIG. 3, a snapshot of each of the three user sessions is illustrated on the attention applications 306, 308, and 310. The user attention profile 302 is a collection of historical attention information regarding the user 304. The user attention profile 302 may include various types of information such as thematic topics to which the user 304 has devoted attention in the past, types of media content to which the user 304 is more or less likely to devote attention (e.g., if the user 304 prefers text to audio), and the intensity of the attention paid by the user 304 to various pieces of media content with which the user has interacted.

The user session illustrated on attention application 306 includes text, an image, and an advertisement labeled AD-1.

According to the methods described herein, the attention application 306 approximates the attention paid by the user 304 to the media content displayed on the attention application 306 and identifies an area 312 and the AD-1 advertisement as areas of elevated attention. The area 312 may be selected based on an overall level of attention paid to all the media content in attention application 306 and/or due to specific measurements such as eye tracking and other I/O inputs indicating elevated attention on the particular area 312. Accordingly, media content inside area 312 and the AD-1 advertisement is stored in the user attention profile 302 as indicating a thematic association and/or a media publisher association with the user 304.

The user session illustrated on attention application 308 includes an audio playback represented by the soundwave. Two advertisements, AD-2 and AD-3, are embedded in the audio media content. According to the methods described herein, the attention application 308 approximates the attention paid by the user 304 to the media content played by the attention application 308 and identifies a range of the audio playback 314 as an area of elevated attention. The area 314 can be identified in several ways. In one implementation, the number of times the user 304 stops, replays, fast-forwards, and plays at regular speed are factors implicating the identification of range 314. For example, if a user replays a portion of the audio more than once, this may be interpreted as an indication of elevated attention. On the other hand, if a user fast-forwards or skips a section of the audio playback, this may be interpreted as reduced attention to these portions. The range 314 may be selected based on an overall level of attention paid to all the media content in attention application 308 and/or due to specific measurements relating to the range 314 (e.g., the user was wearing headphones continuously during playback of range 314 but only sporadically in during other sections of audio playback). Accordingly, media content inside range 314 and the AD-3 advertisement is stored in the user attention profile 302 as indicating a thematic association and/or a media publisher association with the user 304.

The user session illustrated by attention application 310 includes a video playback represented by the video window. Two advertisements, AD-4 and AD-5, are embedded in the video media content. According to the method described herein, the attention application 310 approximates the attention paid by the user 304 to the media content played by the attention application 310 and identifies a range of the video playback 316 as an area of elevated attention. The area 316 can be identified in several ways. In one implementation, the number of times the user 304 stops, replays, fast-forwards, and plays at regular speed are factors implicating the identification of range 316. For example, if a user replays a portion of the video more than once, this may be interpreted as an indication of elevated attention. On the other hand, if the user 304 fast-forwards or skips a section of the video playback, this may be interpreted as reduced attention to these portions. The range 316 may be selected based on an overall level of attention paid to all the media content in attention application 310 and/or due to specific measurements relating to the range 316 (e.g., the user's eye movement was tracked and focused during playback of range 316 but wandered and was unfocused during other sections of video playback). Accordingly, media content inside range 316 and the AD-5 advertisement is stored in the user attention profile 302 as indicating a thematic association and/or a media publisher association with the user 304.

As illustrated in FIG. 3, the user attention profile 302 may include specific pieces of media content, media content themes, media publishers, advertisements, the identity of persons with whom the user 304 interacts, and other media content with which the user has shown an elevated level of attention. Other components of the user attention profile 302 may include the user's query log, browsing history, and browsing habits. Browsing habits may include attention metrics such as a reading speed of the user, a reading comprehension level of the user, frequency with which the user prefers to take breaks from devoting attention to media content, media content formats preferred by the user, etc. The query log, browsing history, and browsing habits may be historical information collected by an attention application and applied to the user attention profile 302 over time.

In some implementations, the user attention profile 302 represents information that is sensitive to the user 304, such as personally identifying information, that the user does not wish to share with other participants or to leak to unauthorized entities (e.g., the user does not want the user attention profile information to be mined). As such, matching against the user profile by advertisers or media content publishers may be performed exclusively on the attention application 306. Thus, the content of the user attention profile 302 may not be directly revealed to media content publishers and/or advertisers who wish to target media content or advertisements to the user 304. Instead, an attention application may demonstrate proof that a user with the user attention profile contents of interest to an advertiser or publisher was shown, and/or devoted a measured amount of attention to, a piece of media content using a zero-knowledge proof.

FIG. 4 is a diagram of an example arrangement 400 of media content in an attention application 406 based on a user attention profile 402 in accordance with some implementations. The media content consumer 404 has a user attention profile 402 associated therewith based on media content, attention, and media browsing history collected by the attention application 406. If a media publisher has access to the user attention profile 402 or if the user allows matching against the user profile 402, then the media publisher may alter the presentation of media content based on the content of the user attention profile 402. For example, in the media content displayed by the attention application 406, there is a section 408 containing media content present in the user attention profile 402. Due to the likelihood that the media content 408 is of increased interest to the user 404 and the user is likely to devote more attention to that media content, the media publisher presents the content in area 408 as relatively larger than other media content displayed on the attention application 406 and larger than the media content in area 408 would have been presented by the media publisher if it had not been present in the user attention profile 402.

Other aspects of the media content displayed in the attention application 406 are altered based on the user attention profile 402. The advertisements 410 and 412, for example, relate to topics included in the user attention profile 402 as having been the subject of increased attention from the user 404 in the past. Other types of media content such as the media content in area 414 may be reduced in size or prominence as displayed on the attention application 406 if it is related to content that is deemed to be unlikely to attract attention from a user with the user attention profile 402.

Figure 5:
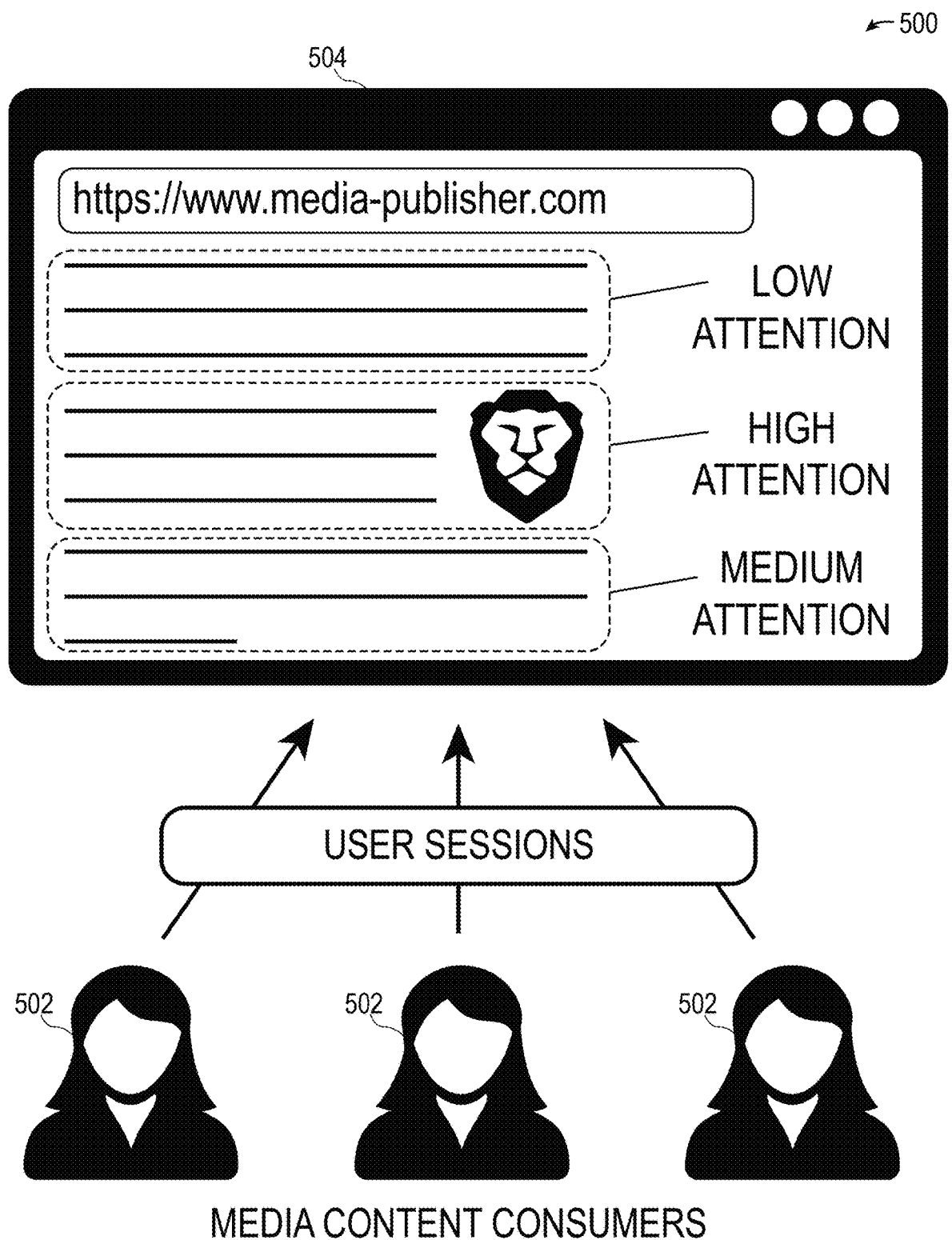
FIG. 5 is a diagram of collection of aggregate user attention indicia with respect to media content in accordance with some implementations.

FIG. 5 is a diagram of collection 500 of aggregate user attention indicia with respect to media content in accordance with some implementations. The example illustrated in FIG. 5 is an aggregate user attention metric collection by an attention consumer from a plurality of media content consumers 502 based on media content displayed in the attention application 504. The plurality of media consumers 502 engage in one or more user sessions with respect to the media content displayed in the attention application 504. According to the techniques described herein, the attention application 504 collects attention metrics on various portions of the media content to yield attention metric designations that are relatively higher or lower in comparison to the other portions of media content that constitute the overall media content displayed in the attention application 504. The relative attention metric values for the various portions of media content may be weighted based on respective user attention profiles of the media content consumers 502 or it may be an aggregate based on all users in the plurality of users 502 without regard to individual preferences.

Figure 6:
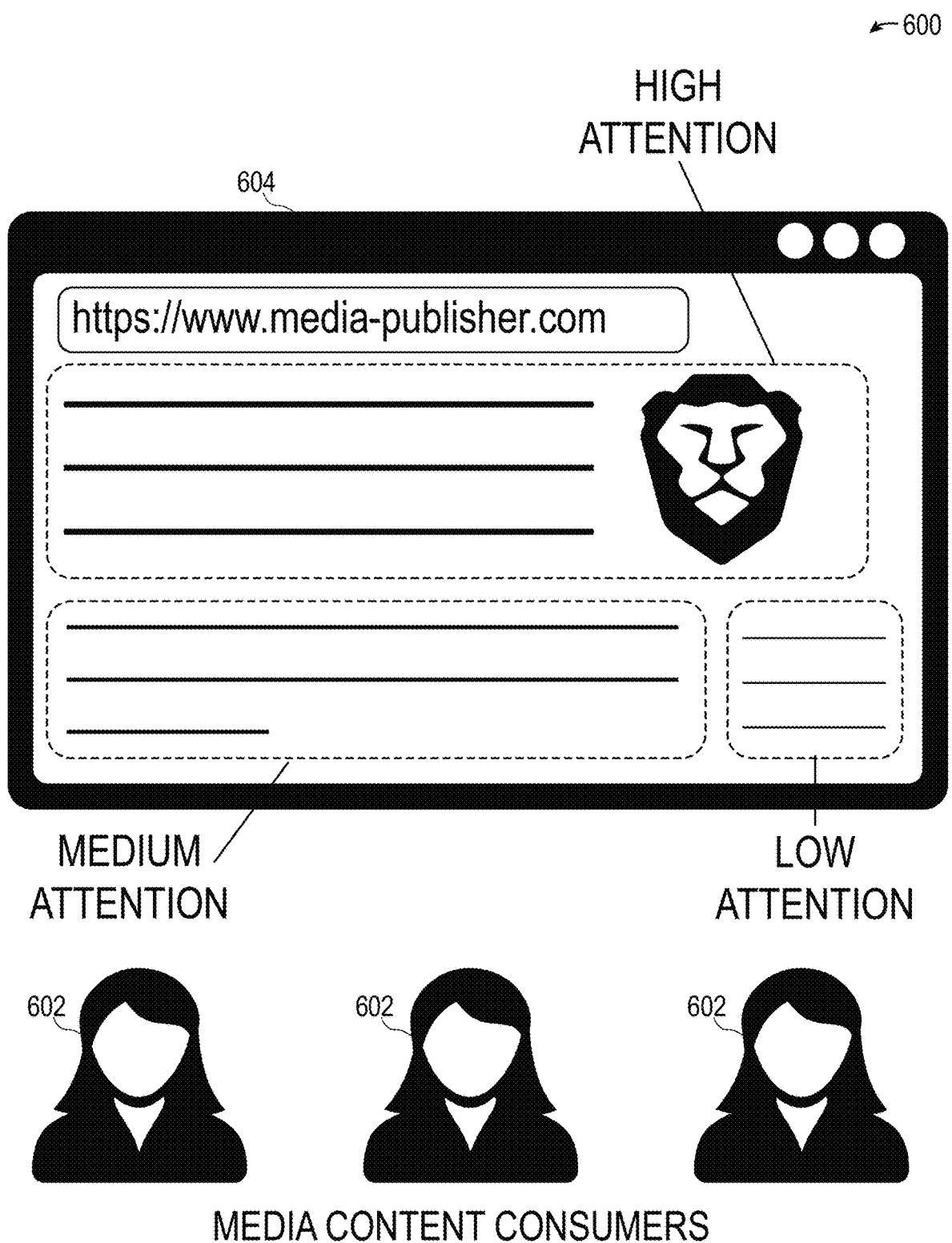
FIG. 6 is a diagram of an example arrangement of media content in an attention application based on aggregate user attention indicia in accordance with some implementations.

FIG. 6 is a diagram 600 of an example arrangement of media content in an attention application 604 based on aggregate user attention indicia in accordance with some implementations. After an attention consumer (e.g., the media content publisher) has designated portions of media content as having relatively higher or lower attention metric values for a piece of media content as illustrated in FIG. 5, the media content may be arranged to emphasize the portions of content that are likely to attract more attention from the plurality of user 602. For example, the portion of media content labeled High Attention is presented in the attention application window as larger and more centralized than the other sections with relatively lower aggregate attention metrics.

Figure 7:
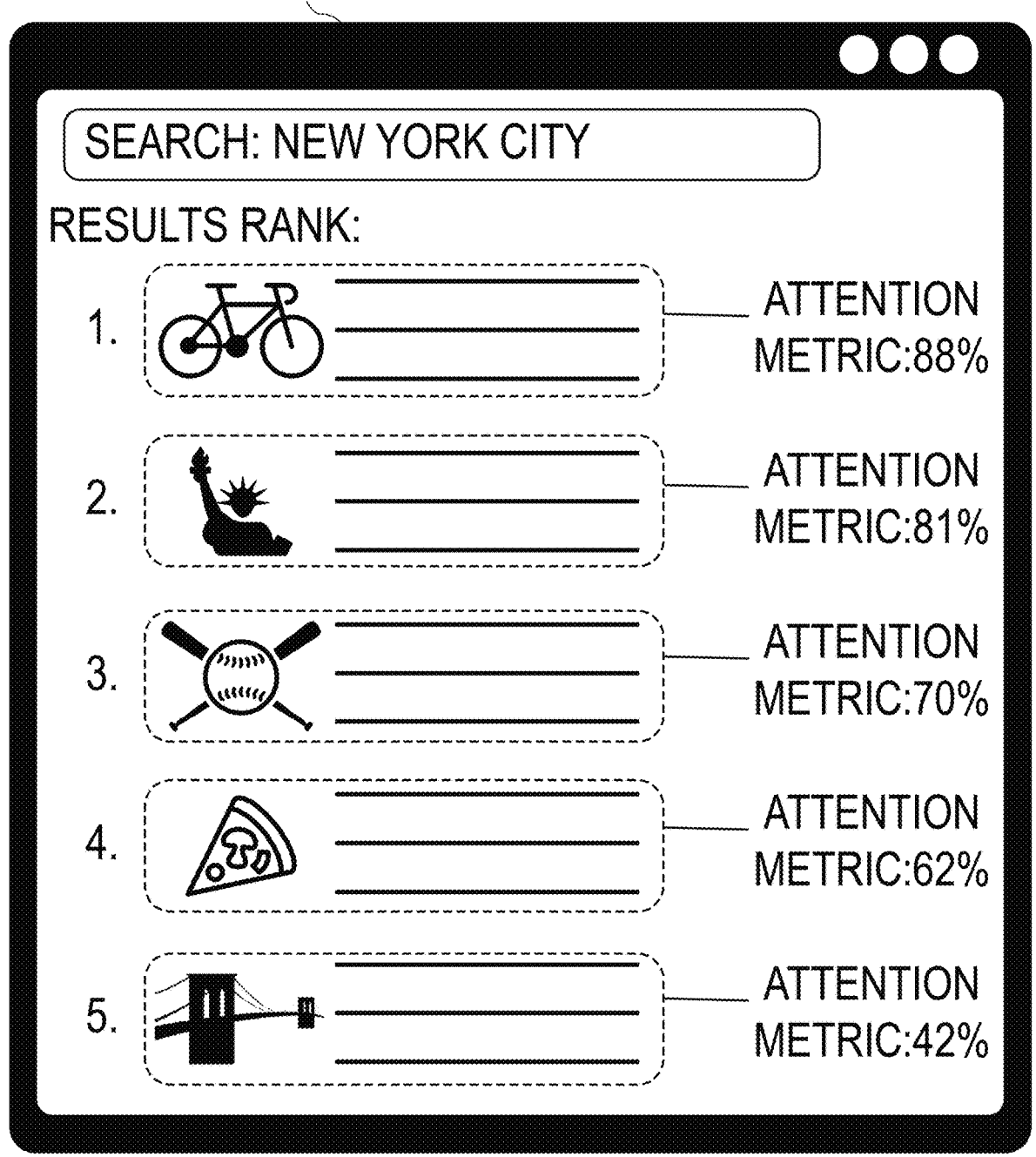
FIG. 7 is a diagram of example search results presented by an attention consumer to a consumer of media content based on aggregate user attention indicia or on an individual user attention profile in accordance with some implementations.

FIG. 7 is a diagram 700 of example search results presented by an attention consumer to a consumer of media content based in accordance with some implementations. In the example illustrated in FIG. 7, the attention consumer is a search engine that has received attention metrics regarding a variety of pieces of media content. A user of the attention application 702 searches on a search term, and the search engine attention consumer orders the search results according to received attention metrics. In one implementation, the attention metrics depicted in the attention application 702 are aggregate attention metrics collected from a plurality of other users. In other implementations, the attention metrics depicted in the attention application 702 are weighted based on the user attention profile of the user submitting the search request.

Figure 8:
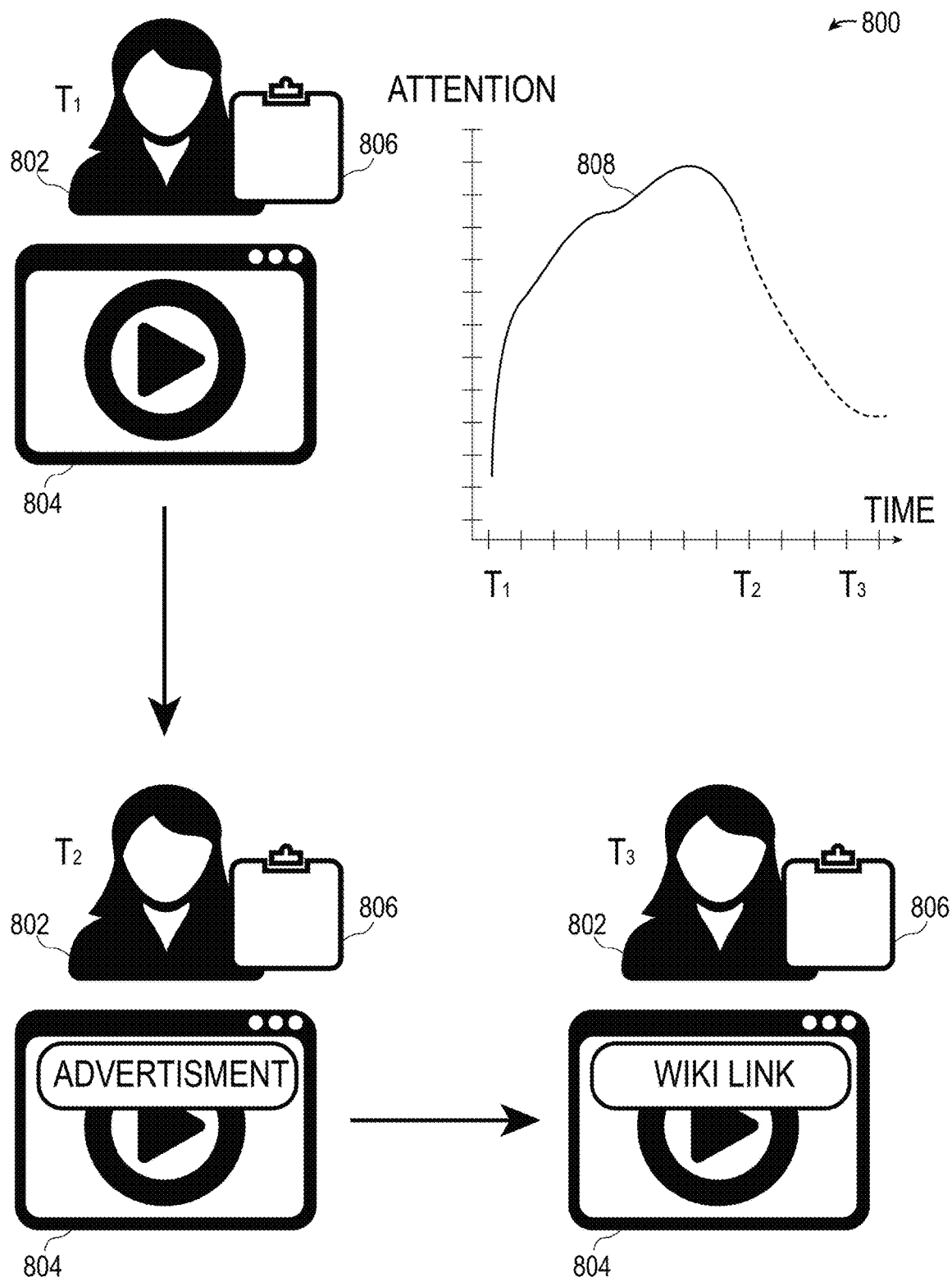
FIG. 8 is a diagram of example user session interruption based on a user attention profile and a plot of user attention and projected user attention over time in accordance with some implementations.

FIG. 8 is a diagram 800 of example user session interruption based on a user attention profile and a plot of user attention and projected user attention over time in accordance with some implementations. In the example illustrated in FIG. 8, a user 802 is associated with a user attention profile 806 and begins viewing media content (e.g., video) in an attention application 804 at a time $T_1$. The attention application begins estimating attention of the user 802 at time $T_1$ as shown on the plot line 808 in FIG. 8. In some implementations, the attention application 804 does not interrupt the user 802 with advertisements or messages when viewing a video with a relatively high attention metric.

One component of the user attention profile 806 is historical attention data and browsing habits relating to the user 802. The historical attention data and browsing habits indicate that the user 802 often maintains increasing attention when viewing a video media content such as the video media content displayed in the attention application 804, and after a time often exhibits declining attention and decides to take a break from viewing the video media content.

At a time $T_2$, attention of the user 802 begins to decline as shown by the plot line 808. In accordance with the user's usual habit, the attention application 804 determines that the user is likely considering a break from the video content and interrupts the user with an advertisement over the video. In the example illustrated in FIG. 8, the user attention profile 806 includes historical data that the user often experiences continuing declines of attention to the video media content until stopping the video and switching to another task around $T_3$. If the user 802 continues to show declining attention up to time $T_3$, the attention application may interrupt the video again to display, in this example, a link to a wiki article relating to the content of the video. The user 802 may have an increased likelihood of stopping the video and switching to reading the wiki link regarding the topic of the video (or another topic) since this pattern of behavior would be consistent with the historical browsing patterns and habits recorded in the user attention profile 806.

Figure 9:
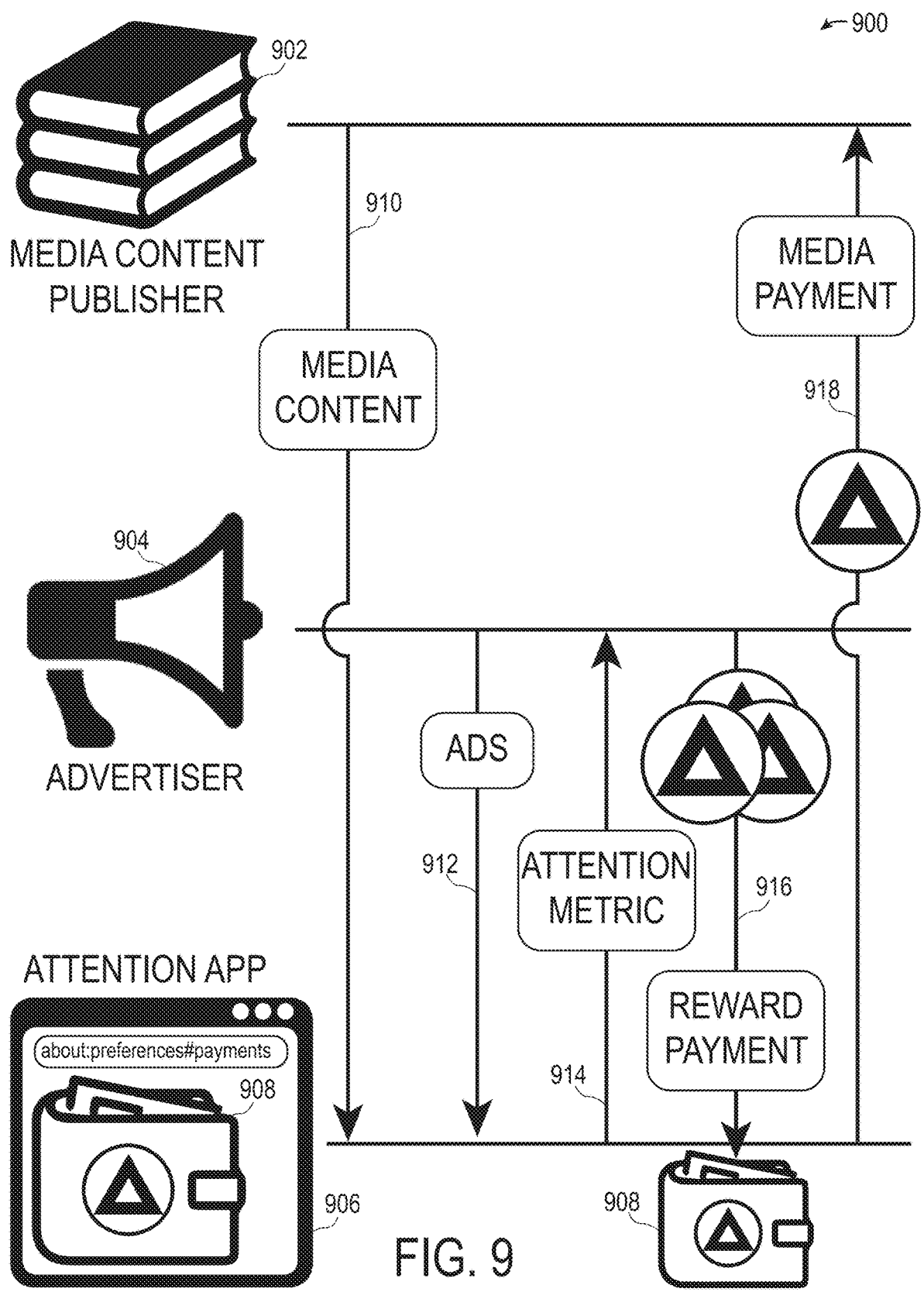
FIG. 9 is a signal diagram of an example reward payment from an attention consumer to a wallet of an attention application of a consumer of media content based on an attention metric in accordance with some implementations.

FIG. 9 is a signal diagram 900 of an example reward payment from an attention consumer 904 to a wallet 908 of an attention application 906 of a consumer of media content based on an attention metric in accordance with some implementations. At 910, a media content publisher 902 transmits media content to an attention application 906. At 912, the attention consumer 904 (e.g., an advertiser) transmits advertisements to the attention application 906. Thereafter, a user of the attention application 906 views the media content and the attention application 906 estimates an attention metric for the user session during which the user interacts with the media content.

At 914, the attention application 906 transmits the attention metric regarding the media content to the attention consumer 904. The attention metric may be of various forms including raw attention data (e.g., how much time the user spent on various parts of the media content and what were the user's interactions with the content), a scalar attention metric value, an attention metric value with associated data such as what weights were given to various user interactions with the media content, and/or a zero-knowledge proof that the attention metric was correctly calculated without revealing the inputs to the calculation.

If the attention consumer 904 deems it appropriate, it may reward the user of the attention application 906 by making a reward payment at 916 of a digital asset. In some implementations, a digital asset wallet 908 is included in the attention application 906 and the digital asset wallet receives the reward payment of the digital asset. In other implementations, the reward payment 916 may be made to the user of the attention application 906 outside the attention application such as to a digital asset payment address provided to the attention consumer 904 by the user of the attention application.

Optionally, at 918 the attention application 906 may make a media payment of the digital asset to the media content publisher 902. In some implementations, the media payment 918 is based on the attention metric estimated by the attention application 906 regarding the media content received from the media content publisher 902. In other implementations, a user of the attention application 906 budgets an amount of the digital asset to be shared across multiple media content publishers 902 according to the fraction of total attention spent on the media content received from each respective media content publisher. The budgeted amount of the digital asset to be paid to various media content publishers 902 may be calculated on a time basis (e.g., monthly) such that the digital budget is spent regardless of how much media content is consumed by the user during the month. In other implementations, the user of the attention application 906 may manually initiate and/or approve media payments 918.

Figure 10:
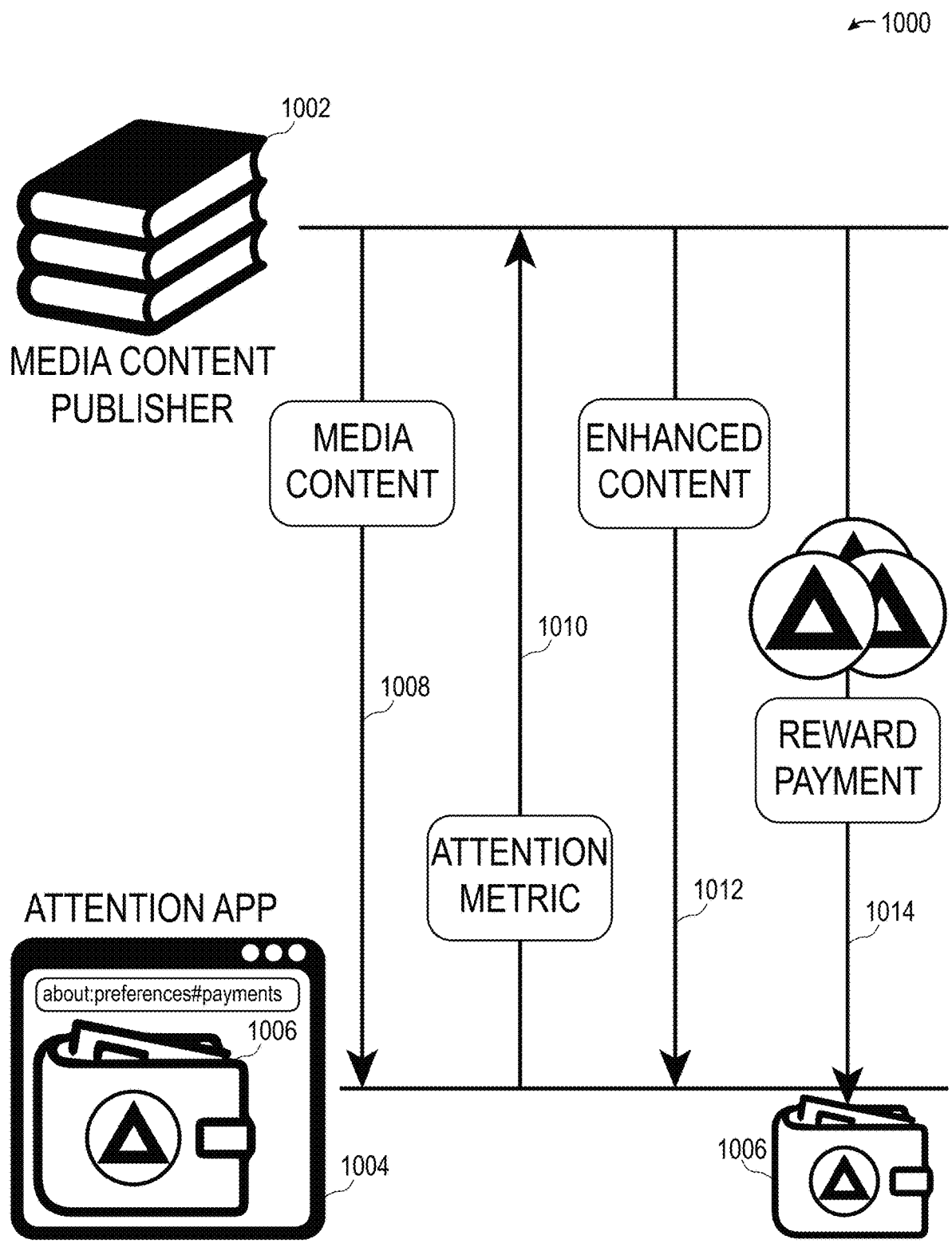
FIG. 10 is a signal diagram of an example reward payment and distribution of enhanced media content from a media content publisher to an attention application of a consumer of media content based on an attention metric in accordance with some implementations.

FIG. 10 is a signal diagram 1000 of an example reward payment 1014 and distribution of enhanced media content 1012 from a media content publisher to an attention application of a consumer of media content 1002 based on an attention metric in accordance with some implementations. In the example illustrated in FIG. 10, the attention consumer is the media content publisher itself. At 1008, the media content publisher distributes media content to an attention application 1004. At 1010, the attention application responds with an attention metric to the attention consumer 1002. The attention metric may be of various forms including raw attention data (e.g., how much time the user spent on various parts of the media content and what were the user's interactions with the content), a scalar attention metric value, an attention metric value with associated data such as what weights were given to various user interactions with the media content, and/or a zero-knowledge proof that the attention metric was correctly calculated without revealing the inputs to the calculation.

If the media content publisher 1002 deems it appropriate, it may distribute enhanced content 1012 to the attention application 1004 in response to the attention metric received at 1010. In other words, if the attention metric is sufficiently high, then the media content publisher may choose to reward the user of the attention application. In other implementations, the attention consumer 1002 may choose to make a payment of a digital asset to a digital asset wallet 1006 of the attention application 1004 to reward the user's attention. If the digital asset wallet 1006 is integrated into the attention application 1004, then the reward payment 1014 will be seamless to the user of the attention application.

Figure 11:
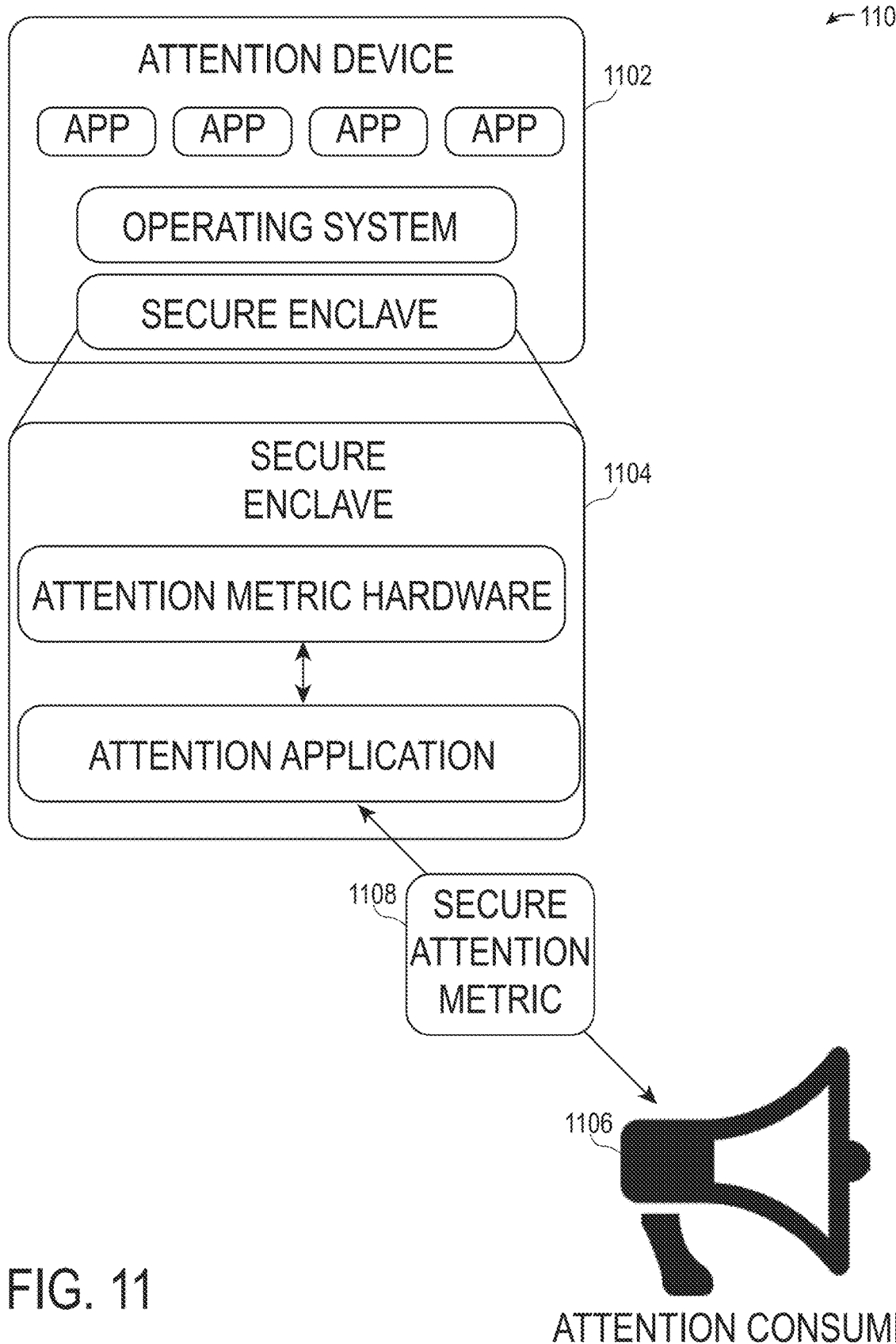
FIG. 11 is a diagram of an attention application running on an attention device with trusted attention sensors and a trusted I/O path for secure transmission of attention metrics to an attention consumer in accordance with some implementations.

FIG. 11 is a diagram of an attention application running on an attention device 1102 with trusted attention sensors and a trusted I/O path for secure transmission of attention metrics to an attention consumer 1106 in accordance with some implementations. If attention consumers are making digital asset payments in accordance with a higher attention metric, the incentives for fraud could be high. Attention consumers may wish to have an assurance or "proof-of-attention" to ensure that the attention application is not spoofing attention metrics in a fraudulent attempt to get paid. One way to provide such an assurance is to use a trusted I/O path from the attention sensors to the attention application through which malicious applications may not interfere.

In one implementation, a secure enclave exists on the attention device 1102 running the attention application. Trusted attention sensors may be included in the secure enclave such that a secure tunnel exists end-to-end for the calculation of attention metrics. As such, the attention application may transmit a secure attention metric 1108 with a digital signature verifying that the indicia of attention on which the attention metric is based are reliable. In implementations wherein a user of the attention application does not wish to reveal the inputs to an attention metric, a zero-knowledge proof may be used to prove the attention metric was performed correctly. When combined with a secure enclave and secure I/O path for the collection of attention indicia, the attention consumer may have a very high confidence that attention metrics are legitimate.

Figure 12A:
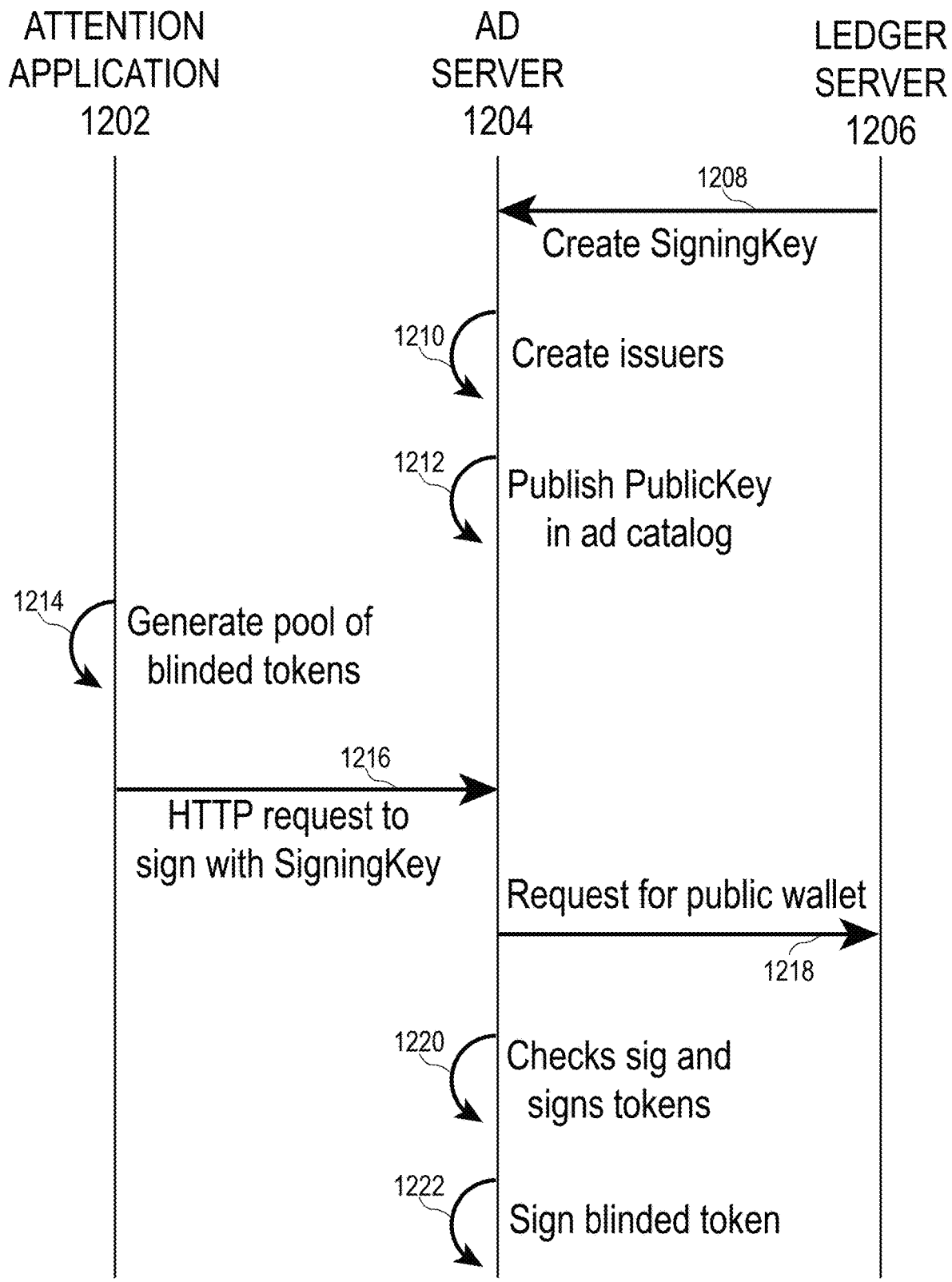
FIG. 12A is a signal diagram of a system including an attention application collecting provable attention indicia of a user and proving via a zero-knowledge proof that conceals the user identity.

FIG. 12A is a signal diagram of a system 1200 including an attention application 1202 collecting provable attention indicia of a user and proving via a zero-knowledge proof that conceals the user identity. This provides a channel for "confirming" the attention indicia 1204 without revealing to another party in the system the particular user involved. The workflow begins with an ad server 1204 communicating with the ledger server 1206 to create an issuer consisting of a signing key for the transaction confirmations described herein. The ad server 1204 thus creates a number of issuers for payment at operation 1210. Each issuer key cfor example could correspond to a different payout value (e.g., 0.1, 0.3, 0.5, 1, 3, 5 attention tokens respectively). The corresponding public key for the confirmations and payments are published in an ad catalog at 1212.

On the attention application 1202, operation 1214 generates a pool of blinded tokens. The attention application 1202 submits an HTTP signed request at 1216 to the ad server 1204 for the ad server to sign with the SigningKey from operation 1208. The ad server 1204 makes a request 1218 to the ledger server 1206 to retrieve the wallet public key. At operation 1220, the ad server 1204 checks the signature over the request and finally signs the tokens at operation 1222.

FIG. 12B is a continued signal diagram of the system 1200 including an attention application 1202 collecting provable attention indicia of a user and proving via a zero-knowledge proof that conceals the user identity. After the ad server 1204 signs the blinded token at 1222, the ad server 1204 creates a proof the tokens were signed at operation 1224. Operation 1224 may also include creating a proof (e.g., a DLEQ proof) demonstrating that the tokens were signed by a SigningKey whose public key was previously published in the catalog and sending the same at 1226. An operation 1228 verifies the proof of operation 1224 (e.g., the DLEQ proof) and the signed tokens are unblinded and stored locally in a confirmation token pool. The HTTP signature over the request restricts confirmation token issuance to valid digital asset rewards wallets on the attention application 1202. In one implementation, a SigningKey rotation is performed to force clients to create a new pool of blinded tokens.

Upon viewing an ad, the attention application 1202 pops an unblinded token from the pool, uses the unblinded token to form a verification key and signs confirmation metadata therewith. At operation 1230, the attention application forms a token redemption request consisting of the verification signature, the request metadata, a token preimage associated with the unblinded token, and the public key corresponding to the key it was signed by. Operation 1230 further involves the attention application 1202 generating a new token and blinding it. Together with the token redemption request, this forms the confirmation request of operation 1230. In response to operation 1230, the attention application 1202 receives a unique identifier by which it can later retrieve a signed token.

At operation 1232, the ad server 1204 looks up the issuer. The ad server at 1234 forwards the token redemption request to the corresponding issuer endpoint of the ledger server 1206, which marks the token preimage as spent at 1236. The ad server 1204 rounds the value of the confirmed event to the nearest value that has a corresponding payout key, then uses this key to sign the blinded token at 1238. A proof of signing (e.g., a DLEQ proof) is also created showing the payment token is signed by a public key existing in the ad catalog. The proof of signing is returned at 1240 and the returned signed token is unblinded and stored locally with the other payment tokens the user has received.

The attention application 1202 can be rewarded a digital asset upon receiving a valid confirmation. In one implementation, the digital asset is worth a fraction of the price charged to the advertiser. Redemption of the digital assets later by the user 1202 should therefore be unlinkable to the attention indicia 1204. For example, the digital asset is a token transferable on a blockchain such as an ERC-20 token on the Ethereum network, which would also prevent double-spending attacks assuming the Ethereum network is not itself attacked.

The confirmation token redemption events should not be linkable to the user of the attention application 1202 to whom they were issued if certain conditions are met. Those conditions are: there is sufficient anonymity set formed by users who are creating confirmations tokens; the time between token issuance and confirmation is not predictable; the confirmation metadata does not include information unique to the user; the user is not made re-identifiable through other side channels such as IP address information (participants in the system can avoid logging IP address or use third-parties for data transmissions that do not log IP address); the signing keys used to sign both confirmation and payment tokens are widely used.

In the system 1200, an advertiser, or another other participant, cannot learn that a user 1202 in a particular market segment and a user 1202 in another market segments are actually the same user 1202. In other words, the system 1200 provides user unlinkability across market segment categorization). Another aspect of the system 1200 is that an advertiser, or another participant, cannot learn that a user 1202 who has viewed or interacted with a creative set and a user 1202 who interacted with a different creative set are the same user (e.g., unlinkability across creative sets). Another aspect of the system 1200 is that no participants in the system can figure out any personally identifiable or sensitive information about the user 1202 without explicit consent of the user.

FIG. 13 is a diagram 1300 of detection of attention grinding by an attention application in accordance with some implementations. Attention grinding as used herein means a farm of real or automated users 1306 who simulate user attention on media content in an effort to generate high attention metrics with the intention of collecting a digital asset reward. Depending on the type of attention sensors used, an automated user 1306 may be able to simulate inputs to the attention application 1304 that fools the attention application 1304 into assigning an attention metric. In other examples, a real live user 1306 may be hired to manually simulate attention on media content.

The attention application 1304 may detect attention grinding in several ways. Any automated user will lack the ability to make certain inputs like eye tracking. For real live users, the users are likely not actually paying attention to the media content and therefore engage in user behavior that is different from authentic users. For example, the real live user 1306 may scroll over text at a speed that is too high for the user to likely have been able to read the text. The real live user may scroll back and forth over the same piece of text in a regular manner that is indicative of not reading. New page views may come too close together for an authentic user to have been likely to have read the text. Other indications include volume turned down during audio playback indicating no user is listening.

In cases of suspected attention grinding, the attention applications 1304 detect and report the suspected grinding to the attention consumer 1302. Once notified, the attention consumer is free to disregard the attention metrics received from the suspected grinders and/or decline to make digital asset reward payments thereon.

Figure 14:
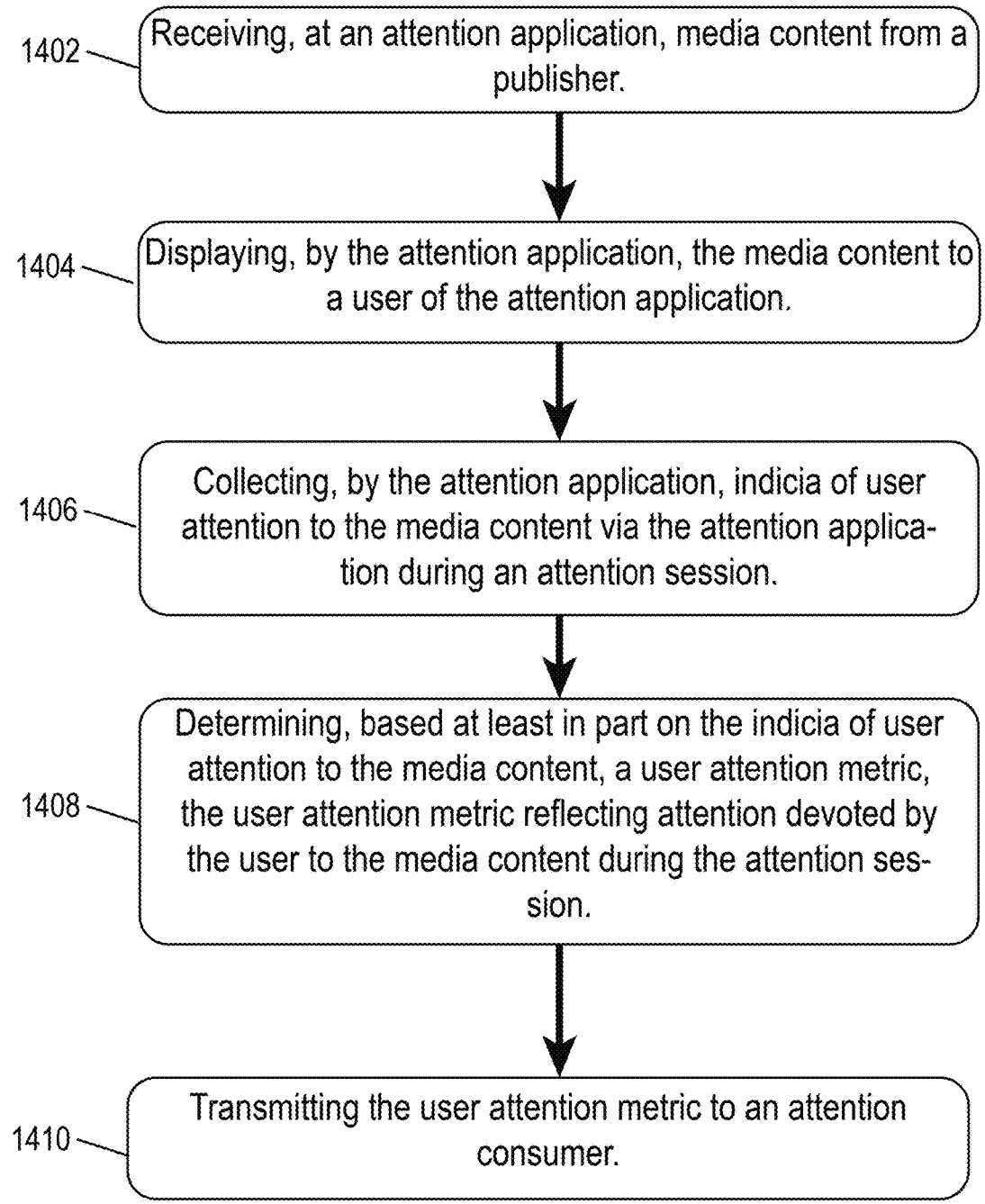
FIG. 14 is a flowchart of an example method of creating a media content user attention metric in accordance with some implementations.

FIG. 14 is a flowchart of an example method 1400 of creating a media content user attention metric in accordance with some implementations. A receiving operation 1402 receives, at an attention application, media content from a publisher. The media content may include text, images, video, audio, an application, data for another application (e.g., an e-reader), or any media content with which a user may interact. A displaying operation displays, by the attention application, the media content to a user of the attention application. As used herein, the term "displays" means any way of exhibiting the media content, not only visual methods—for example, speakers playing an audio file or an application outputting running on media content data.

A collecting operation 1406 collects, by the attention application, indicia of user attention to the media content via the attention application during an attention session. The attention session may be defined to be the amount of time a user interacts with media content (e.g., until the user closes a browser tab, navigates away from the media content, stops audio, closes an e-book, closes a video game application, etc.). The collecting operation 1406 may be carried out via attention sensors embedded in or associated with a hardware device running the attention application. In some implementations, the collecting operation 1406 is performed by authenticated hardware with access to a secure enclave through which results of the attention sensors may be guaranteed to be authentic.

A determining operation 1408 determines, based at least in part on the indicia of user attention to the media content, a user attention metric, the user attention metric reflecting attention devoted by the user to the media content during the attention session. The determining operation 1408 may be carried out in several ways. A formula may be used to assign certain attention units (AUs) to each of a variety of user interactions with the media content. The user interactions may be weighted to give more AUs to user interactions that are more likely to represent user attention (e.g., eye tracking that shows the user has read a number of lines of text may be given more weight than dwelling on a page since the user may not have been looking at the screen during the dwell period). A transmitting operation 1410 transmits the attention metric to an attention consumer. The attention consumer may be the media publisher, an advertiser placing ads on media content, and/or a third-party service provider (search engine, content aggregator, content streamer, etc.).

Figure 15:
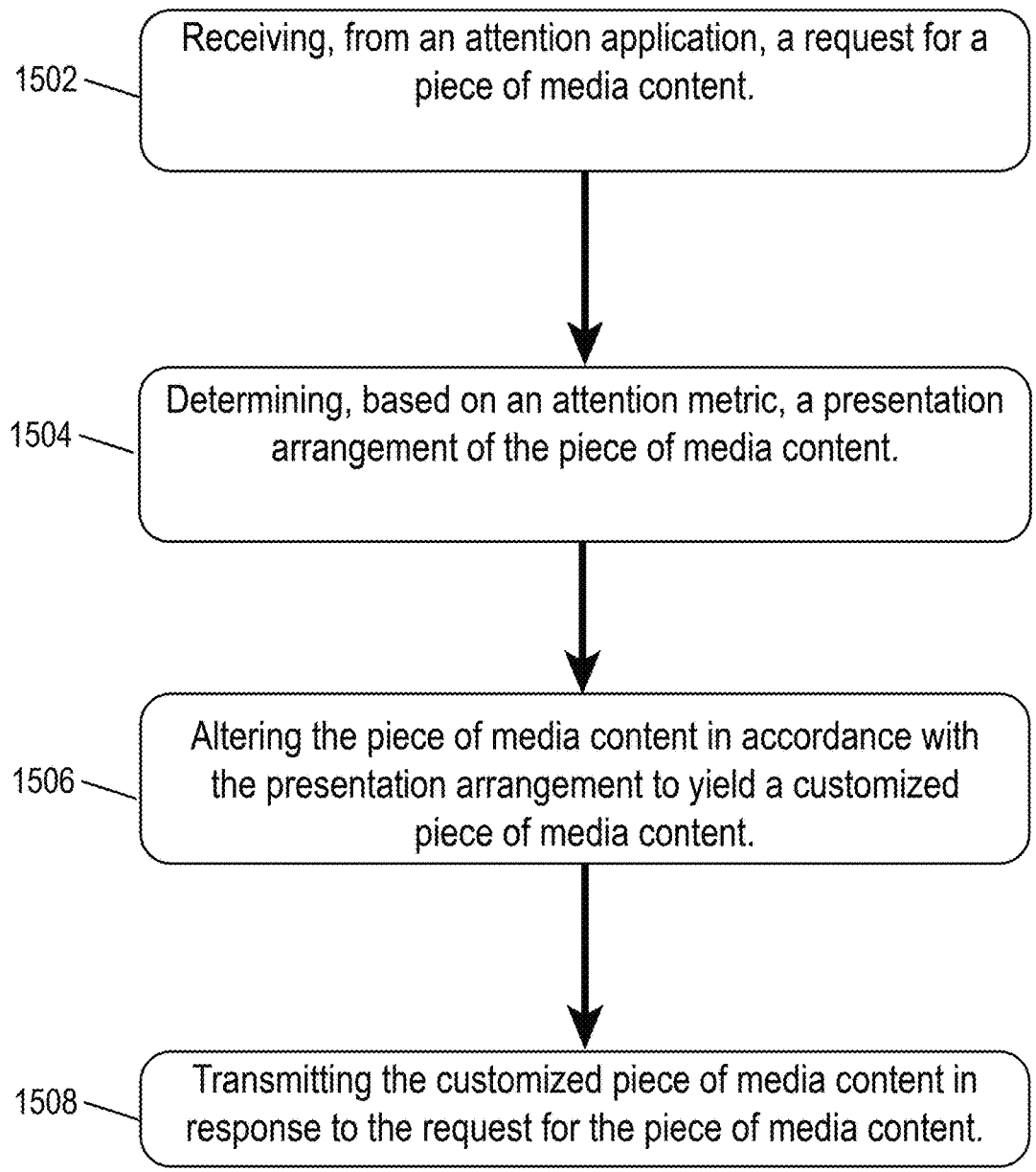
FIG. 15 is a flowchart of an example method of providing attention to media content on an attention application in accordance with some implementations.

FIG. 15 is a flowchart of an example method 1500 of providing attention to media content on an attention application in accordance with some implementations. A receiving operation 1502 receives from an attention application, a request for a piece of media content. The attention application may be any application configured to exhibit media content to a user (e.g., a web browser, an online forum browser, a gaming system, etc.).

A determining operation 1504 determines, based on an attention metric, a presentation arrangement of the piece of media content. The determining operation may be based on a user attention profile of a user associated with the attention application. In other implementations, the determining operation 1504 is based on an aggregate attention metric from a plurality of users. An altering operation 1506 alters the piece of media content in accordance with the presentation arrangement to yield a customer piece of media content. The media content itself need not be altered—the altering operation 1506 may only alter the presentation of the media. In some implementations, the altering operation 1506 emphasizes content that is likely to be of interest, and therefore attract the attention of, the user. A transmitting operation 1508 transmits the customized piece of media content in response to the request received in operation 1502.

Figure 16:
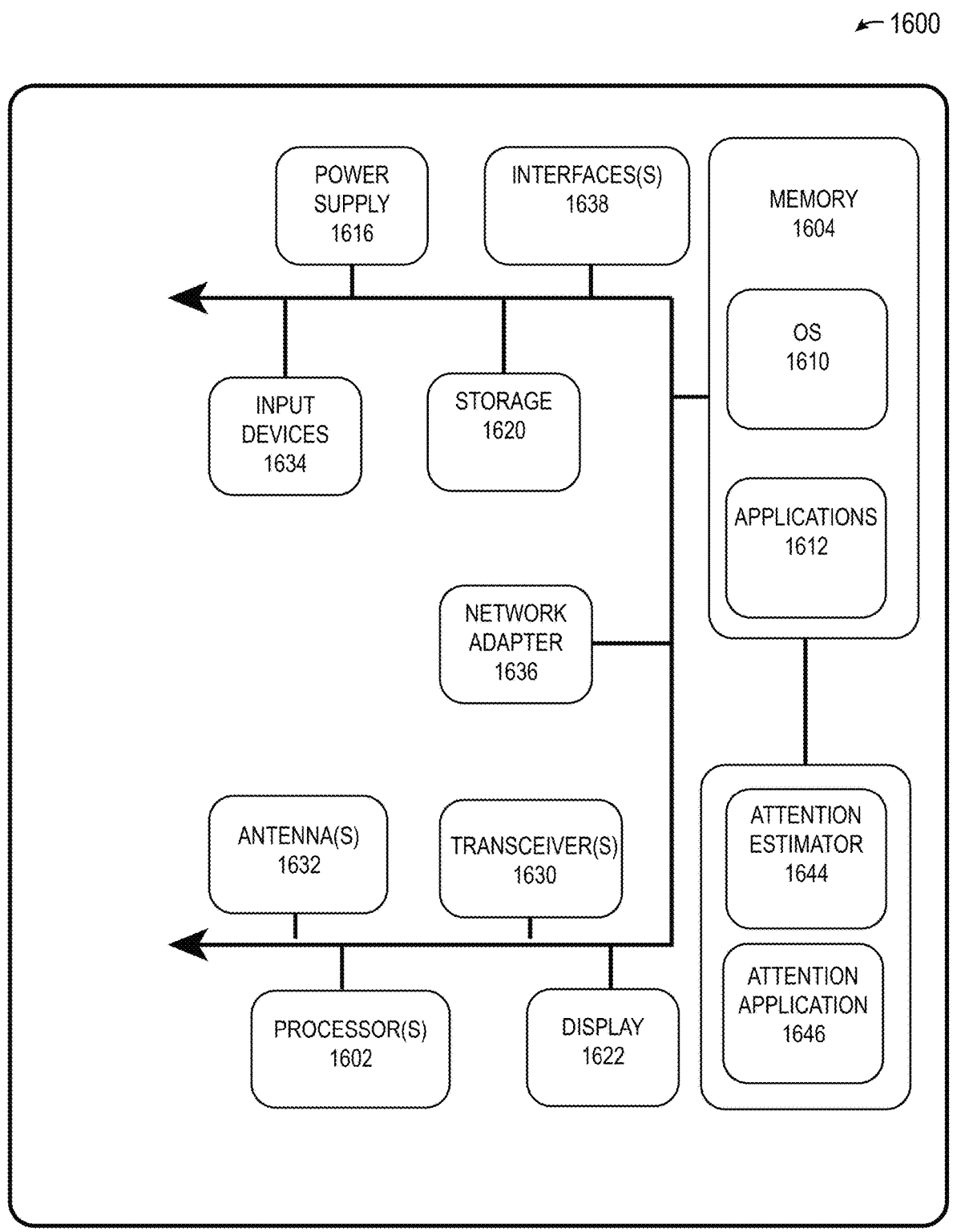
FIG. 16 is a flowchart of an example method of determining user attention with respect to media content in accordance with some implementations.

FIG. 16 is a diagram of a system 1600 that may be useful for implementing attention metrics on an attention application. FIG. 16 illustrates an example system (labeled as a processing system 1600) that may be useful in implementing the described technology. The processing system 1600 may be a client device, such as a smart device, connected device, Internet of Things (IoT) device, laptop, mobile device, desktop, tablet, or a server/cloud device. The processing system 1600 includes one or more processor(s) 1602, and a memory 1604. The memory 1604 generally includes both volatile memory (e.g., RAM) and non-volatile memory (e.g., flash memory). An operating system 1610 resided in the memory 1604 and is executed by the processor 1602.

One or more application programs 1612 modules or segments, such as an attention estimator 1644 and attention application 1646 are loaded in the memory 1604 and/or storage 1620 and executed by the processor 1502. In some implementations, the oracle manager 1644 is stored in read-only memory (ROM) 1614 or write once, read many (WORM) memory. Data such as extrinsic event data sources may be stored in the memory 1604 or storage 1520 and may be retrievable by the processor 1602 for use by oracle manager 1644 and the blockchain manager 1646, etc. The storage 1620 may be local to the processing system 1600 or may be remote and communicatively connected to the processing system 1600 and may include another server. The storage 1620 may store resources that are requestable by client devices (not shown). The storage 1620 may include secure storage such as one or more platform configuration registers (PCR) managed by one or more trusted platform modules (TPMs), which may be implemented in a chip or by the trusted execution environment (TEE).

The processing system 1600 includes a power supply 1616, which is powered by one or more batteries or other power sources and which provides power to other components of the processing system 1600. The power supply 1616 may also be connected to an external power source that overrides or recharges the built-in batteries or other power sources.

The processing system 1600 may include one or more communication transceivers 1630 which may be connected to one or more antenna(s) 1632 to provide network connectivity (e.g., mobile phone network, Wi-Fi®, Bluetooth®, etc.) to one or more other servers and/or client devices (e.g., mobile devices, desktop computers, or laptop computers). The processing system 1600 may further include a network adapter 1636, which is a type of communication device. The processing system 1600 may use the network adapter 1636 and any other types of communication devices for establishing connections over a wide-area network (WAN) or local area network (LAN). It should be appreciated that the network connections shown are exemplary and that other communications devices and means for establishing a communications link between the processing system 1600 and other devices may be used.

The processing system 1600 may include one or more input devices 1634 such that a user may enter commands and information (e.g., a keyboard or mouse). Input devices 1634 may further include other types of input such as multimodal input, speech input, graffiti input, motion detection, facial recognition, physical fingerprinting, etc. These and other input devices may be coupled to the server by one or more interfaces 1638 such as a serial port interface, parallel port, universal serial bus (USB), etc. The processing system 1600 may further include a display 1622 such as a touch screen display.

The processing system 1600 may include a variety of tangible processor-readable storage media and intangible processor-readable communication signals including in virtual and/or cloud computing environment. Tangible processor-readable storage can be embodied by any available media that can be accessed by the processing system 1600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing system 1600. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computer-implemented method of presenting media content on an attention application with a user attention metric, the method comprising:
  receiving, at an attention application, first media content from a publisher;
  displaying, by the attention application, the first media content to a user of the attention application;
  collecting, by the attention application, indicia of user attention to the first media content via the attention application during an attention session;
  determining, based at least in part on the indicia of user attention to the first media content, a user attention metric, the user attention metric reflecting attention devoted by the user to the first media content during the attention session;
  appending the attention metric to an attention profile confined locally to the attention application, the attention profile including historical attention information collected by the attention application;
  receiving, at the attention application, second media content from another publisher, the second media content reserving a portion of screen space for advertisements;
  matching an advertisement against the historical attention information collected by the attention application in the attention profile;
  displaying, by the attention application, the second media content to the user of the attention application altered into an arrangement based at least in part on content of the attention profile wherein the matched advertisement is automatically displayed relatively larger on the attention application than other advertising content; and
  providing to the another publisher the attention metric and that the second media content was displayed to the user on the attention application with a zero-knowledge cryptographic proof wherein it is proven that the attention metric has been correctly calculated based on an attention formula without revealing inputs to the attention formula.

2. The method of claim 1, wherein the contents of the attention application are not revealed to the another publisher.

3. The method of claim 1, wherein the indicia of user attention includes a scrolling speed of a window of the attention application, the window of the attention application displaying the media content.

4. The method of claim 1, further comprising:
  initiating a payment of value, from a digital asset wallet in the attention application, to the publisher, the payment of value being based at least in part on the user attention metric.

5. The method of claim 1, wherein the user attention metric is based at least in part on an amount of time spent by the user viewing the media content in the attention application.

6. The method of claim 5, wherein the user attention metric is based at least in part on a fraction of a total amount of the media content viewed by the user.

7. The method of claim 1, wherein the user attention metric includes a zero-knowledge proof, the zero-knowledge proof cryptographically proving the user attention metric is based on the indicia of user attention without revealing the indicia of user attention.

8. The method of claim 1, wherein the determining operating includes detecting attention grinding.

9. The method of claim 1, further comprising:
  accumulating a user history, the user history being based on attention indicia regarding a plurality of types of media content;
  determining whether the user session satisfies an interruption condition based at least in part on the user history; and displaying an interrupting message if the user session satisfies the interruption condition.

10. The method of claim 1, further comprising:
receiving, from the user, instructions to exclude the content of one of a query log, browsing history, and thematic topic from the attention profile; and
excluding the content of one of the query log, browsing history, and thematic topic from the attention profile.

11. A media content user attention metric system, the system comprising:
a transceiver that receives first media content from a publisher;
a processor for executing an attention application, the attention application presenting at least a portion of the first media content to a user via a media exhibitor;
a user attention sensor that collects indicia of user attention to the first media content during a user session to yield an attention metric reflecting attention devoted by the user to the first media content during an attention session;
an attention estimator appending the attention metric to an attention profile, the attention profile including historical attention information of the user; and
the attention application further:
receiving second media content from another publisher, the second media content reserving a portion of screen space for advertisements;
matching an advertisement against the historical attention information appended by the attention sensor to the attention profile;
displaying, by the media exhibitor, the second media content to the user of the attention application altered into an arrangement based at least in part on content of the attention profile wherein the matched advertisement is automatically displayed relatively larger on the attention application than other advertising content; and
providing to the another publisher the attention metric and that the second media content was displayed to the user on the attention application with a zero-knowledge cryptographic proof wherein it is proven that the attention metric has been correctly calculated based on an attention formula without revealing inputs to the attention formula.

12. The system of claim 11, wherein the media content includes audio content, the user attention sensor includes earbuds that sense whether the earbuds are inserted into ears of the user, and the indicia of user attention includes an amount of time the earbuds were inserted into the ears of the user during playback of the audio content.

13. The system of claim 11, wherein the user attention sensor includes an eye tracking sensor and the indicia of user attention includes user eye movements during presentation of the media content by the media exhibitor.

14. The system of claim 11, wherein the transceiver does not reveal contents of the attention profile to the second media publisher.

15. The system of claim 11, wherein the media content includes text and the indicia of user attention includes at least one of: hovering, highlighting, and perturbations of a mouse with respect to the media content.

16. The system of claim 11, wherein the user attention sensor includes a secure input path to the attention application, the user attention sensor providing the indicia of user attention over the secure path to the attention application.

* * * * *